United States Patent
Miaowu et al.

(10) Patent No.: US 10,279,461 B2
(45) Date of Patent: May 7, 2019

(54) MULTI-FUNCTIONAL GARDEN TOOLS

(71) Applicant: ZHEJIANG SUNSEEKER INDUSTRIAL CO., LTD, Jinhua (CN)

(72) Inventors: Ma Miaowu, Jinhua (CN); Wang Haiwei, Jinhua (CN)

(73) Assignee: ZHEJIANG SUNSEEKER INDUSTRIAL CO., LTD, Jinhua (CN)

(*) Notice: Subject to any disclaimer, the term of this patent is extended or adjusted under 35 U.S.C. 154(b) by 0 days.

(21) Appl. No.: 15/689,170

(22) Filed: Aug. 29, 2017

(65) Prior Publication Data
US 2018/0361555 A1 Dec. 20, 2018

(30) Foreign Application Priority Data
Jun. 15, 2017 (CN) .......................... 2017 1 0453311

(51) Int. Cl.
B25F 3/00 (2006.01)
H02J 7/00 (2006.01)
(Continued)

(52) U.S. Cl.
CPC ................ B25F 3/00 (2013.01); A01D 34/84 (2013.01); A01D 34/90 (2013.01); A01G 3/053 (2013.01);
(Continued)

(58) Field of Classification Search
CPC ........... B25F 3/00; A01G 20/43; A01G 3/053; A01G 3/086; A01D 34/84; A01D 34/90;
(Continued)

(56) References Cited

U.S. PATENT DOCUMENTS

2012/0210585 A1* 8/2012 Gieske .................. A01G 3/086 30/296.1
2016/0227694 A1* 8/2016 Bermudez .............. A01G 3/086
(Continued)

Primary Examiner — Phong Nguyen
(74) Attorney, Agent, or Firm — Reches Patents

(57) ABSTRACT

The disclosure provides a multi-purpose portable gardening tool with multiple heads and combinations, belonging to the technical field of electric gardening tools. It solves the technical problems that the existing gardening tools have single function and are inconvenient to carry. The multi-purpose portable gardening tool with multiple heads and combinations includes a main machine, a function head, an extension tube, an extension intermediate head and a function intermediate head; the function head or the extension intermediate head is in spigot joint with a head end of the main machine, a head end of the extension intermediate head is connected to the extension tube having the function intermediate head at a head end thereof, and the function head is in spigot joint with a head end of the function intermediate head. The gardening tool in the disclosure at least includes three function heads, and may further extend more functions and methods of application by combining the function heads to the main machine and combining the main machine to the extension intermediate head, the function intermediate head and the extension tube, so that the gardening tool has more abundant functions to carry out multi-job operations only by one set of equipment, thereby improving convenience of use.

20 Claims, 32 Drawing Sheets

(51) Int. Cl.
*A01D 34/90* (2006.01)
*B27B 17/08* (2006.01)
*A01D 34/84* (2006.01)
*A01G 3/053* (2006.01)
*A01G 3/08* (2006.01)
*A01G 20/43* (2018.01)

(52) U.S. Cl.
CPC ............ *A01G 3/086* (2013.01); *A01G 20/43* (2018.02); *B27B 17/083* (2013.01); *H02J 7/0045* (2013.01); *H02J 7/0063* (2013.01)

(58) Field of Classification Search
CPC ..... B27B 17/083; H02J 7/0045; H02J 7/0063; A01B 1/20
USPC .......................................................... 30/122
See application file for complete search history.

(56) References Cited

U.S. PATENT DOCUMENTS

| | | | |
|---|---|---|---|
| 2017/0043470 A1* | 2/2017 | Kong | B25F 3/00 |
| 2017/0106520 A1* | 4/2017 | Schadow | B25F 3/00 |
| 2018/0084731 A1* | 3/2018 | Harris | A01G 3/086 |
| 2018/0104809 A1* | 4/2018 | Dyer | B25F 3/00 |

\* cited by examiner

MULTI-FUNCTIONAL GARDEN TOOLS

TECHNICAL FIELD

The disclosure relates to the technical field of electric gardening tools, in particular to a multi-purpose portable gardening tool with multiple heads and combinations.

BACKGROUND OF THE DISCLOSURE

Gardening tools are classified into engine type gardening tools and electric gardening tools in accordance with the different power modes. The engine type gardening tools are powered by a two-stroke or four-stroke engine, but have shortcomings that the tools are relatively bulky. However, the workers using the gardening tools generally need to deal with gardens of more than 2 acres, where the workers also need to deal with affairs such as trimming lawn, flatting bushes, cutting branches and blowing leaves in the same place, requiring a variety of machineries. Therefore, the disclosure provides a portable light-weight all-in-one gardening tool which will bring great convenience to gardeners. When carrying out operations by adopting the gardening tools in the prior art, it is necessary to carry a longer power cord or a small power generator to ensure the power supply, and a converter is also required as the tool usually uses DC, resulting in increase of the cost. Such problem restricts most of the operations outdoor or even operations in the garden, park and other places which are very far away from the power supply, and these places all require the gardeners to carry the power supply themselves, especially AC power supply input. As a result, the tools are very inconvenient to use.

SUMMARY OF THE DISCLOSURE

In view of the above-mentioned problems in the prior art, the disclosure provides a multi-purpose portable gardening tool with multiple heads and combinations. A technical problem to be solved by the disclosure is how to improve the convenience of using the gardening tools.

The disclosure is achieved by the following methods: a multi-purpose portable gardening tool with multiple heads and combinations is provided, including a main machine, a function head, an extension tube, an extension intermediate head and a function intermediate head; the function head or the extension intermediate head is in spigot joint with a head end of the main machine, a head end of the extension intermediate head is connected to the extension tube having the function intermediate head at a head end thereof, and the function head is in spigot joint with a head end of the function intermediate head.

The function head includes a connection machine head and a function machine head, the function machine head includes a chain saw function head, a grass trimmer function head, a bush saw head and a leaf blower head, and the function machine head is integrally provided with the connection machine head; an insertion chute C is outwardly disposed on the connection machine head, the insertion chute C is connected to the function head connecting chutes at a function head junction or connected to the extension intermediate head to connect to the function head; the function machine head includes a chain saw function head, a grass trimmer function head, a bush saw head and a leaf blower head so as to achieve a chain saw function, a grass trimmer function, a bush saw function and a leaf blower function; the long distance and middle distance operations can be achieved by connecting the extension tube to the extension intermediate head;

The chain saw function head is provided with a brake and a relay starter;

The grass trimmer function head is provided with a multicolor grass trimmer head which is filled in a whole bale manner and provided with detachable top fasteners and bottom fasteners which are in screwed connection with the top and the bottom of a coil column;

The leaf blower head includes a drive elbow tube and a turbofan; and

The bush saw head is provided with a relay starter and a saw blade supporting guide rod capable of bending, and a number of saw blades spliced together are disposed in a saw blade slot;

The extension tube may be in spigot joint with the function intermediate head which is provided with a turning support, so that the function intermediate head may turn at least 180 degrees;

The main machine and the function head are both provided with a voltage compatible controller, so that a voltage downward-compatible function of the main machine and the function head may be achieved with respect to different mobile battery packs;

The function head, or the extension intermediate head or the function intermediate head is in spigot joint with the main machine and then locked and unlocked by a top fastening device or an internal pressure fastening device or a lateral fastening device;

The main machine includes a grip handle which is provided with an intermittent trigger switch and a mobile battery pack which is provided with an LED indicator drive module.

Compared with the background, the embodiment has the following beneficial effects:

1. The gardening tool is suitable for home and is also very suitable for large gardens. For home, as the gardening tool has many functions, the collection space can be saved, so that one family does not need to purchase a large number of gardening tools but can have a complete set of garden maintenance tools spending only one third to one fifth price; the gardening tool is more suitable for the maintenance of large parks, lawns, hotels and botanical gardens and one such tool can be responsible for the multi-job operations of all the gardens in one working area at the same time, and can further extend more functions and methods of application by combining the function heads to the main machine and combining the main machine to the extension intermediate head, the function intermediate head and the extension tube, e.g., the function head can be connected to the main machine directly, so that the tool is operated by hands directly in short distance for short distance operation; the gardening tool can be used for middle distance operation by adopting a segment of extension tube or retracting to a middle distance. It is also used for long distance operation by extending the extension tube, thereby meeting different operating environments.

2. The function head can be extended and designed into a shape of a chute, and the chute is designed to be provided with a sliding tongue and other mechanisms of the safety switch, thus facilitating protecting circuits inside the tubes and the main machine structure; it is more convenient to replace without moving other components but only releasing the function head fastening device of the head and then connecting a new head; the gardening tool is powered by a mobile battery AC pack, and there is at least one mobile battery AC pack which can also be expanded to two, so that the available capacity of the battery is increased. The tool is further provided with a special LED indicator module for indicating and reflecting the overall operation of the product, the circuit of the indicator module adopts double insurance filter and positive-negative filter, so that such design has double insurance to further prolong the life of LED lamps and the service life of the tool, and has low failure rate and stable wave path voltage; the tool adopts a self-memory lamp drive unit, a control unit, a single battery sampling unit and a memory storage unit so that each setting data can be saved and recalled. In this way, the units can be disposed in the circuit of electric tools with different requirements, especially all-in-one gardening tools so as to overcome problem that the multi-in-one gardening tools have a bloated design in the circuit because the output requirements of each work head are not the same.

3. The voltage downward-compatible controller is disposed in the main machine, so that the tool can adapt to different mobile battery pack series and can convert the voltage, the multiple lithium battery pack series are used in cross voltage platform manner, and the controller will achieve that the different voltage battery packs can be used in the whole machine under different voltages. The controller is connected to the battery pack and the whole machine in series through leads. The controller may achieve BUCK/BOOST voltage to achieve voltage conversion and current supply, thereby achieving the extended application of the battery packs, i.e., 40 series lithium battery packs, and the product can be applied to 5-35 series power tools and gardening tools to achieve the universality of the battery pack. The replay is provided so that the chain saw may be started, thereby obviously improving the starting performance of the chain saw and avoiding the phenomenon that it is very laborious to start the chain saw manually and the problem that women and other weak workers are hard to pull to start the chain saw manually; the technical solution has three different types of fastening devices which can handle the connection between the function heads and the intermediate heads in different cases and provide safety power supply control twice; the tool is provided with the brush saw head which can cut the brushes into a shape of arc, thereby making arc-shaped models of seedlings. Also, a single set of blades can be maintained separately.

DETAILED DESCRIPTION OF THE PRESENT DISCLOSURE

Figure 1:
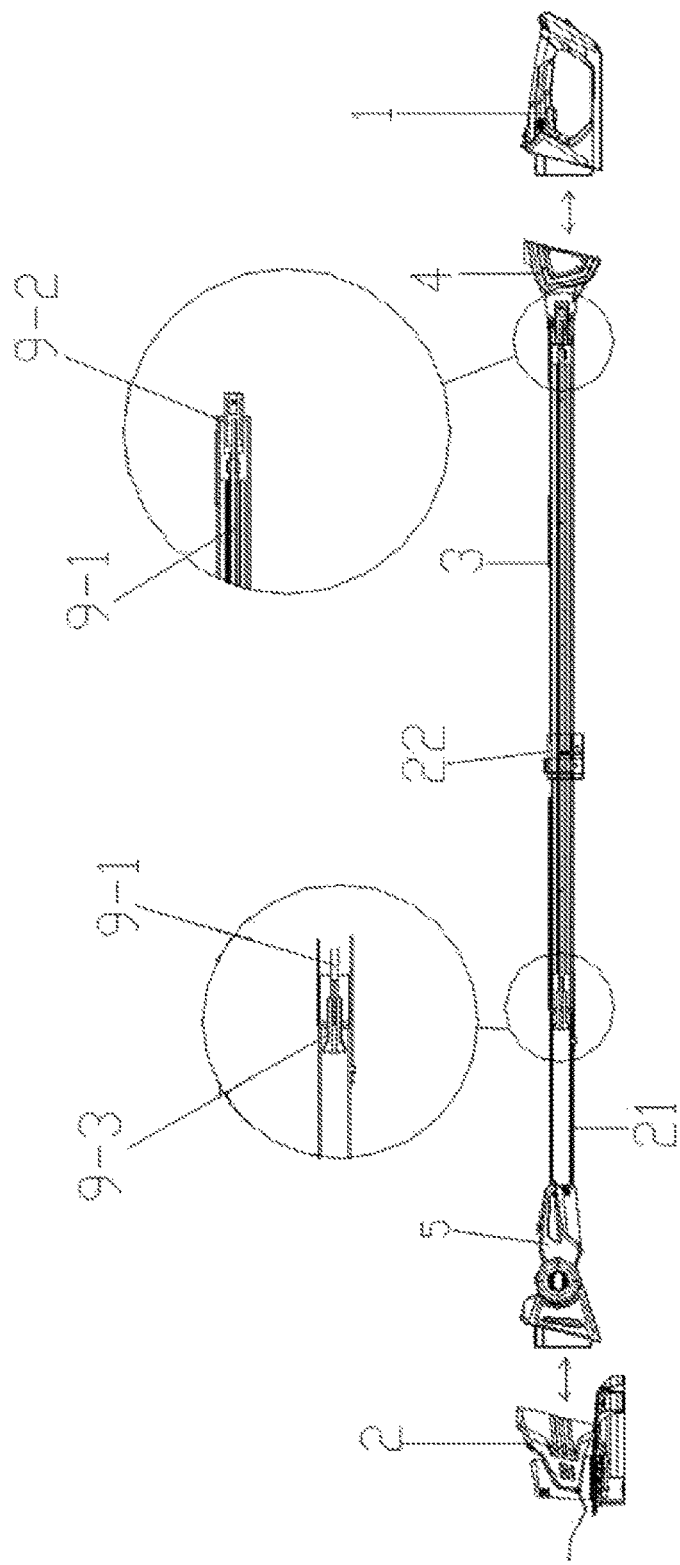
FIG. 1 is an overall connection diagram of an exemplary structure of the present disclosure.

The technical solutions of the present disclosure will further be described in detail with reference to the accompanying drawings by embodiments.

Figure 2:
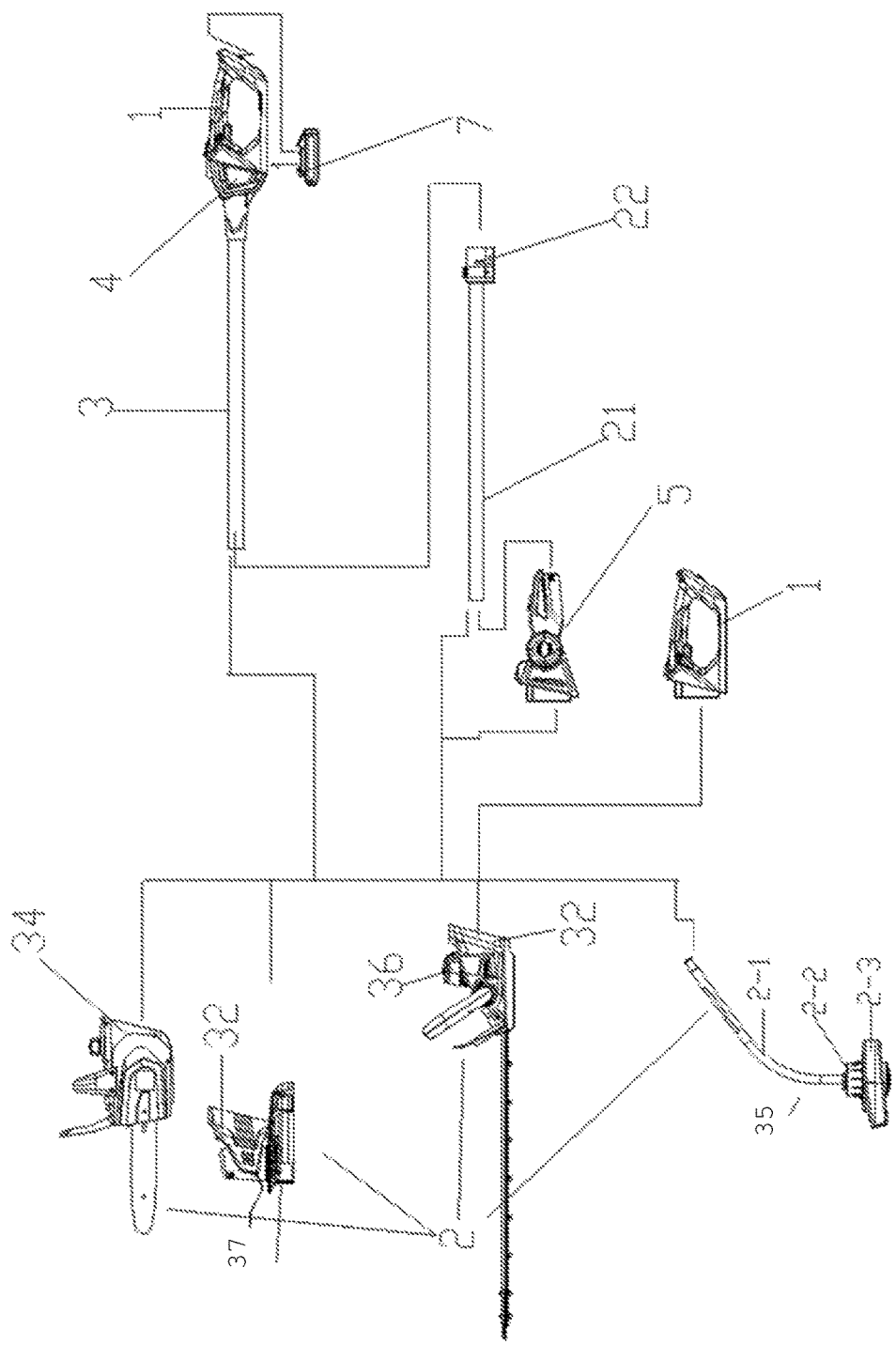
FIG. 2 is a schematic diagram of combining short-distance and long-distance tool.
Figure 3:
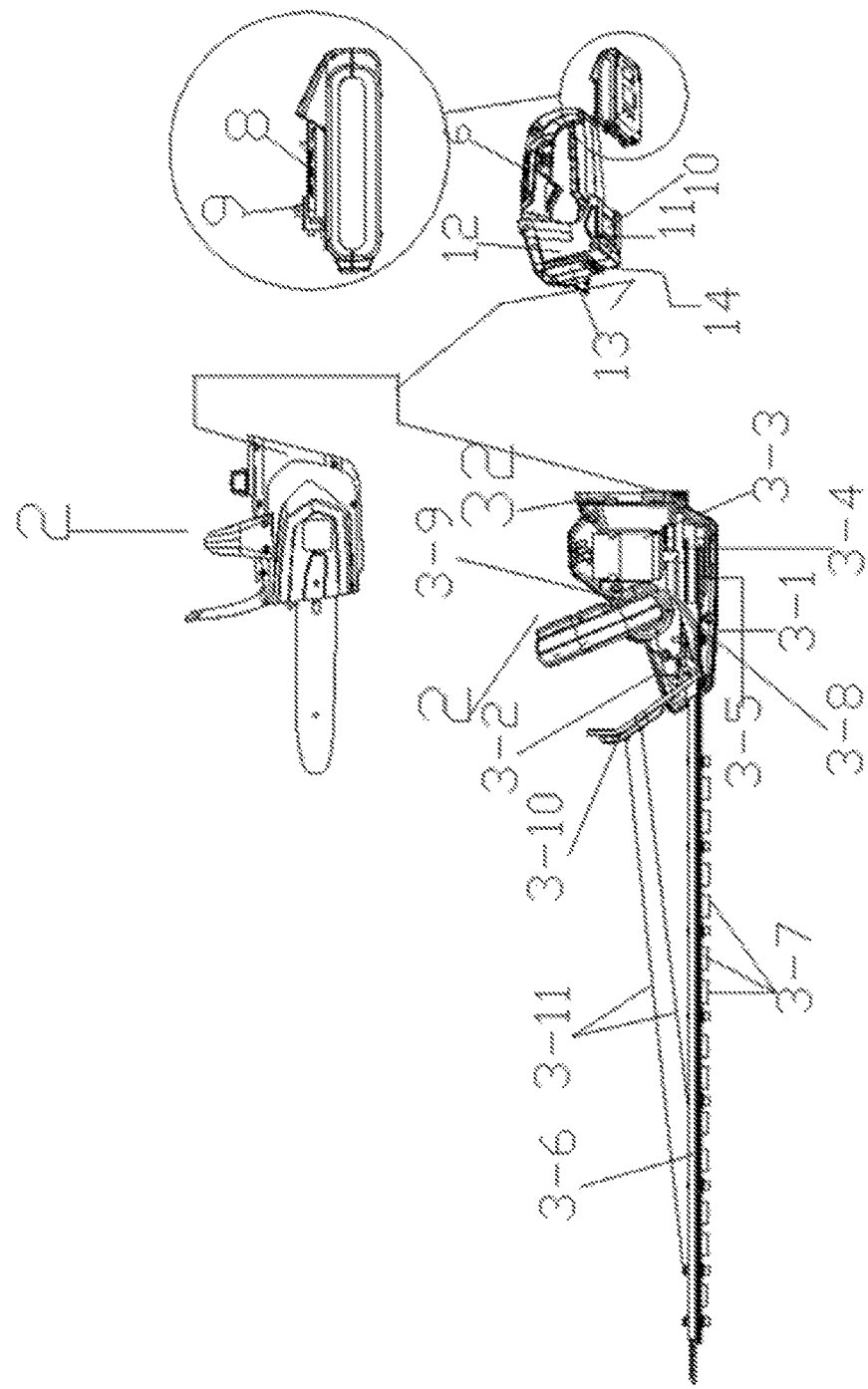
FIG. 3 is a schematic diagram of a short-distance connection function.
Figure 4:
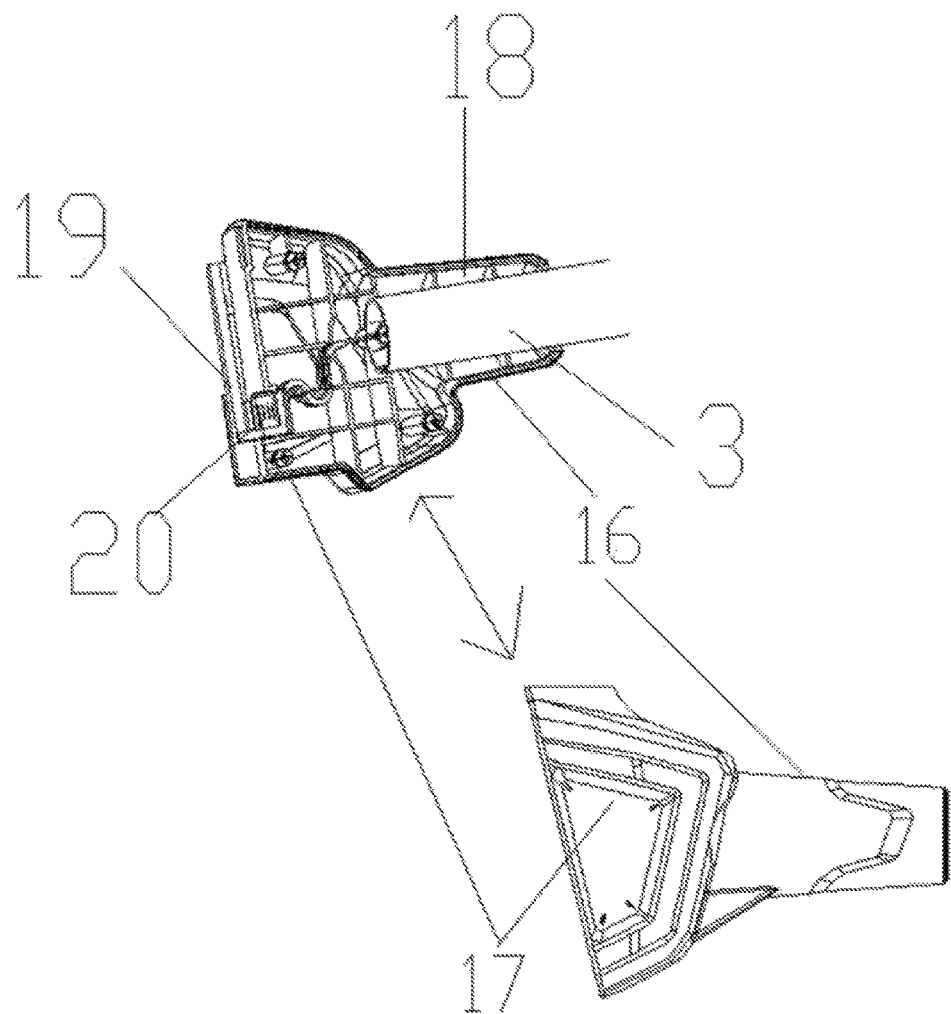
FIG. 4 is a structural diagram of an extension intermediate head.
Figure 5:
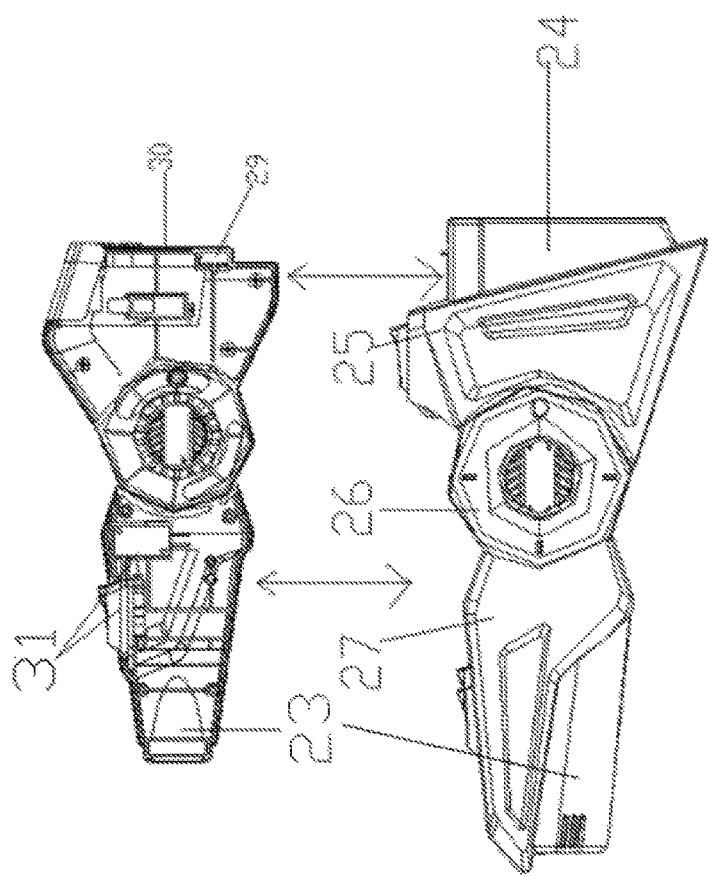
FIG. 5 is a structural diagram of a function intermediate head.
Figure 6:
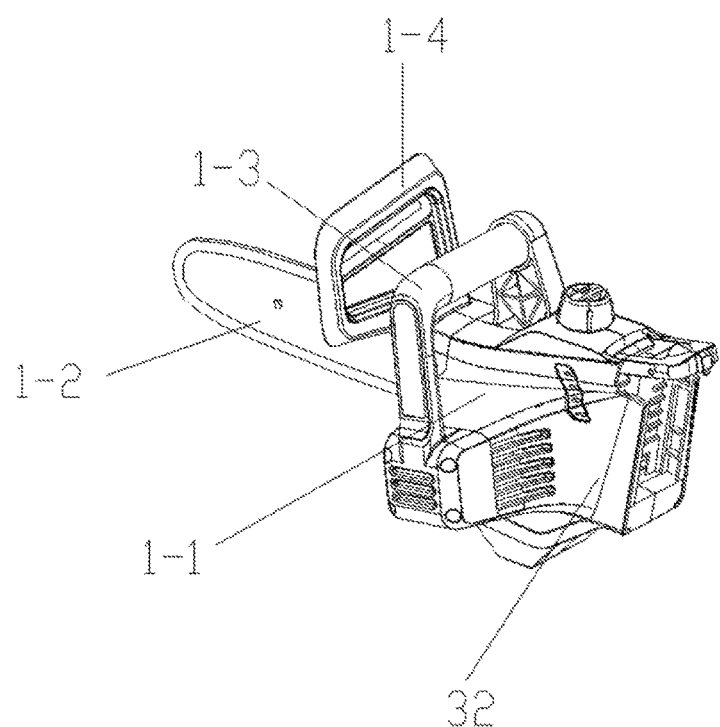
FIG. 6 is a structural diagram of a chain saw function head.
Figure 7:
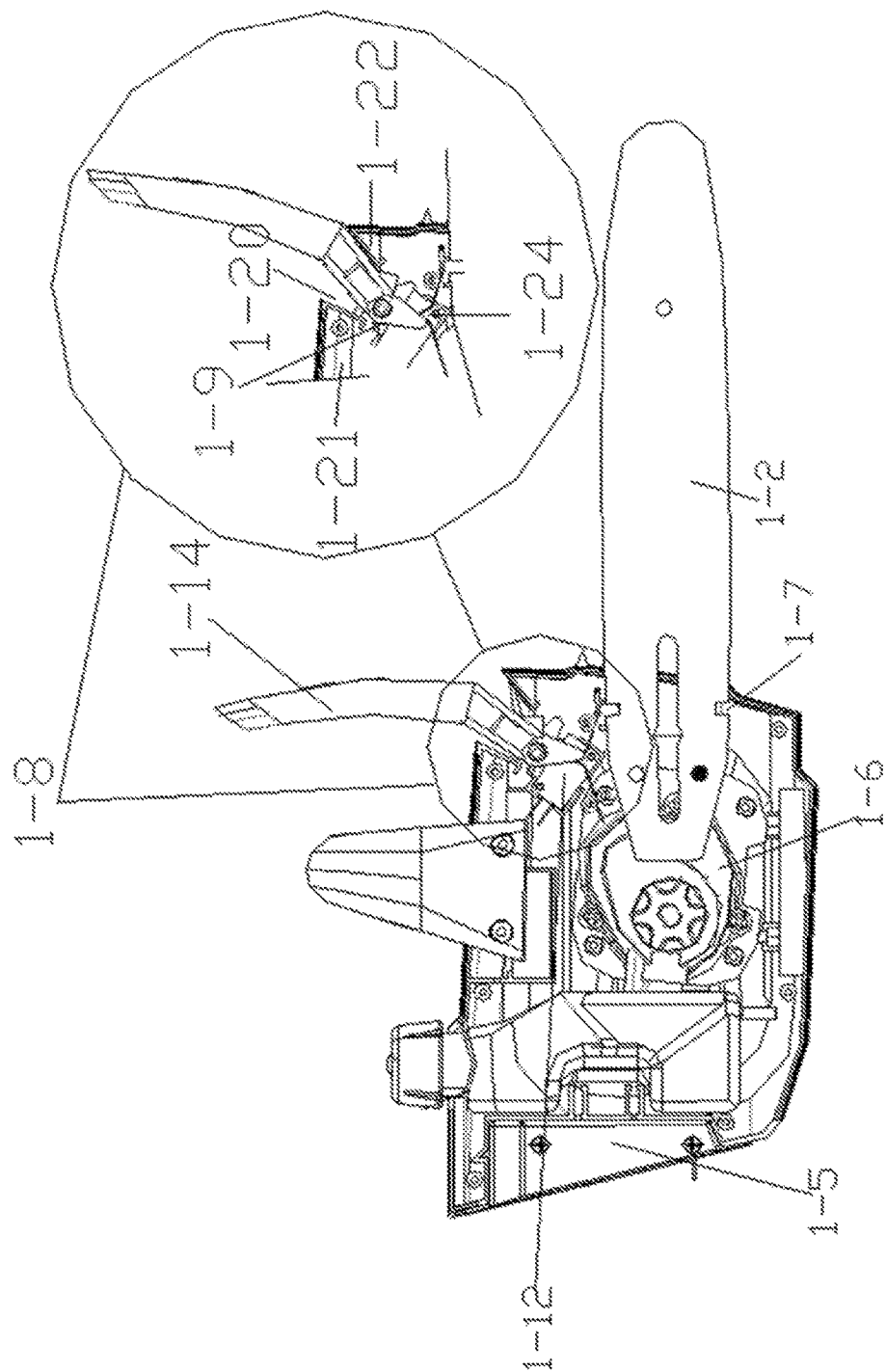
FIG. 7 is an interior view of the chain saw function head.
Figure 8:
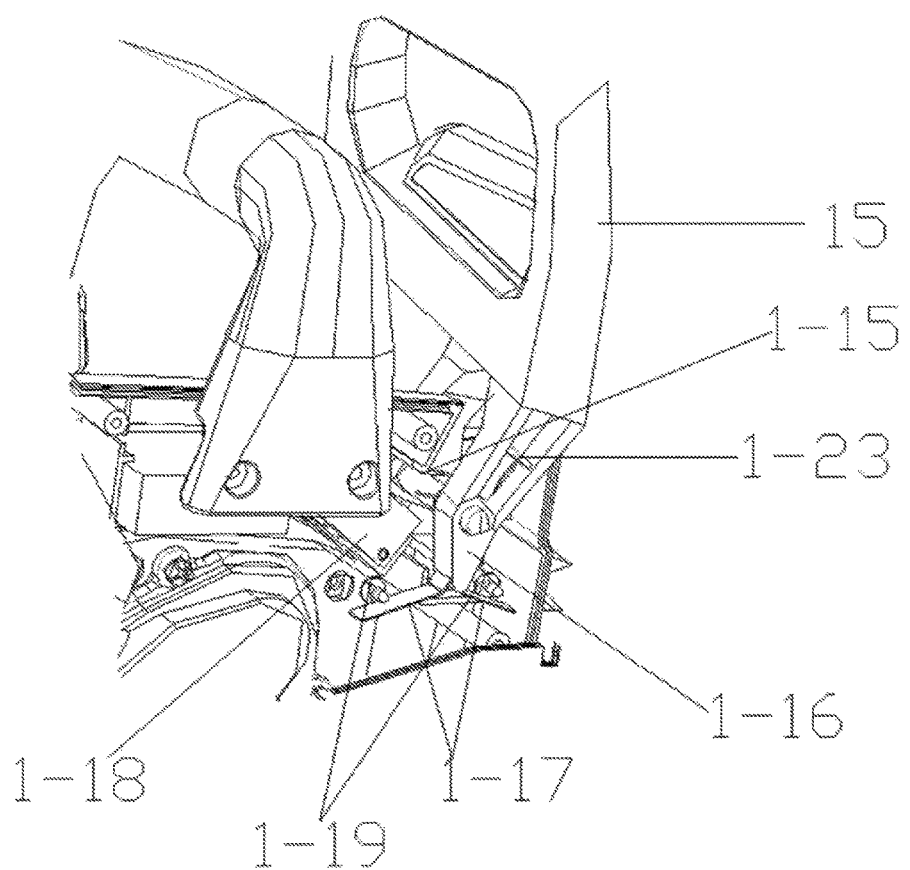
FIG. 8 is a structural diagram of a brake device of the chain saw function head.
Figure 9:
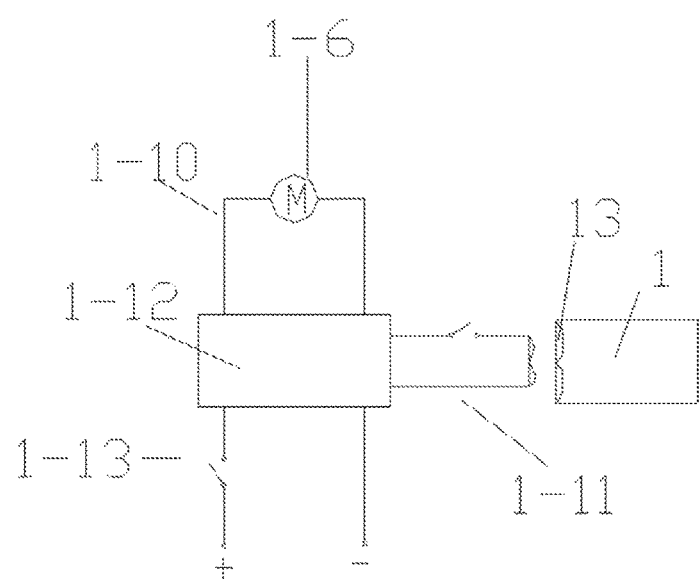
FIG. 9 is a schematic circuit diagram of the brake device.
Figure 10:
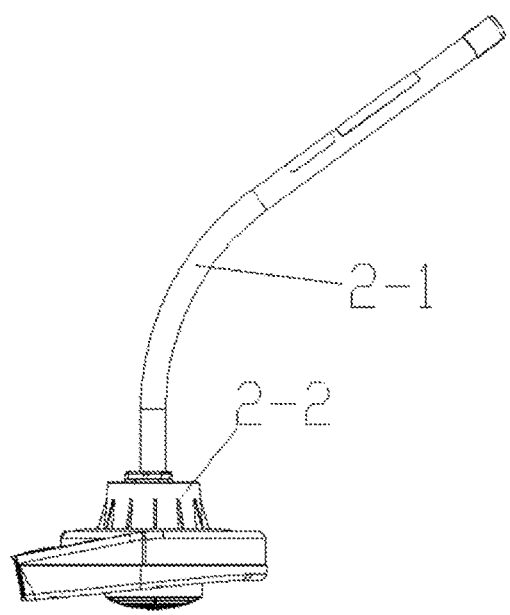
FIG. 10 is a structural diagram of a leaf blower head.
Figure 11:
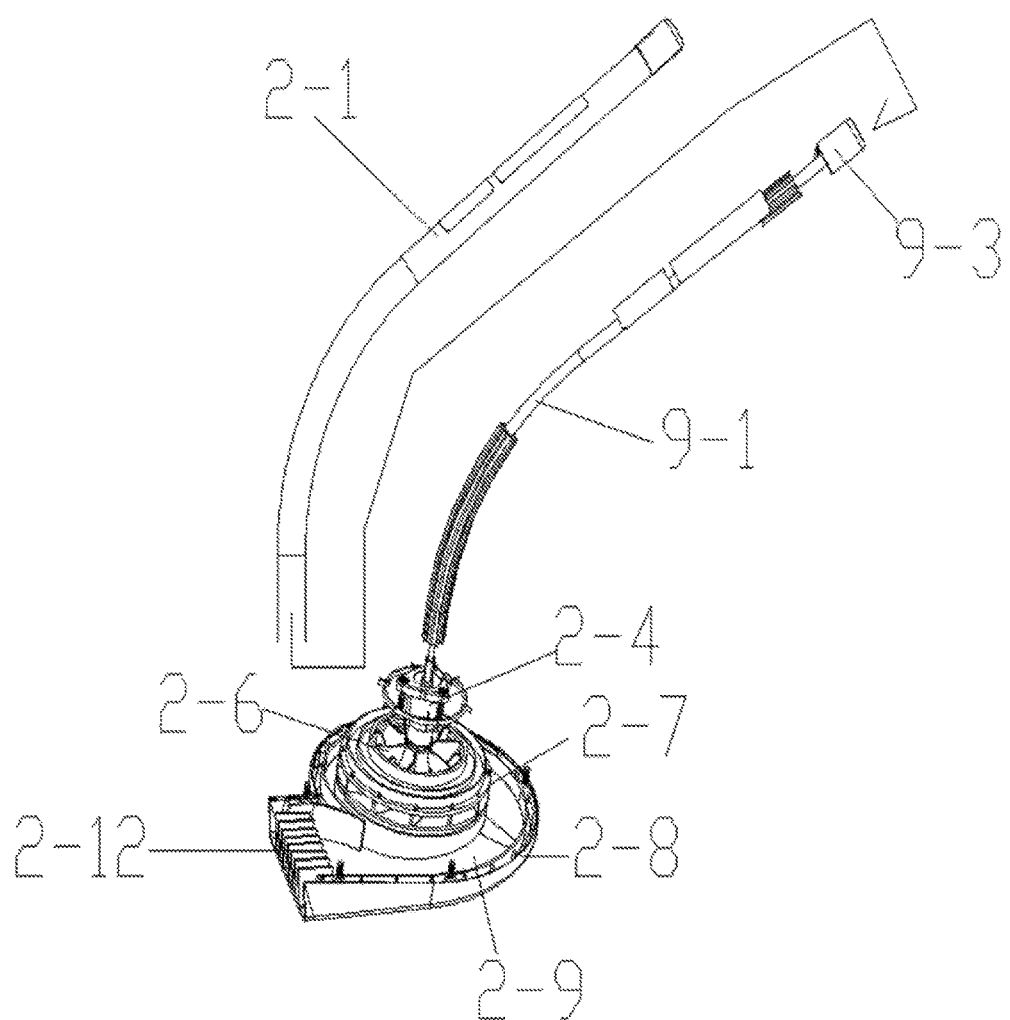
FIG. 11 is an interior view of the leaf blower head.
Figure 12:
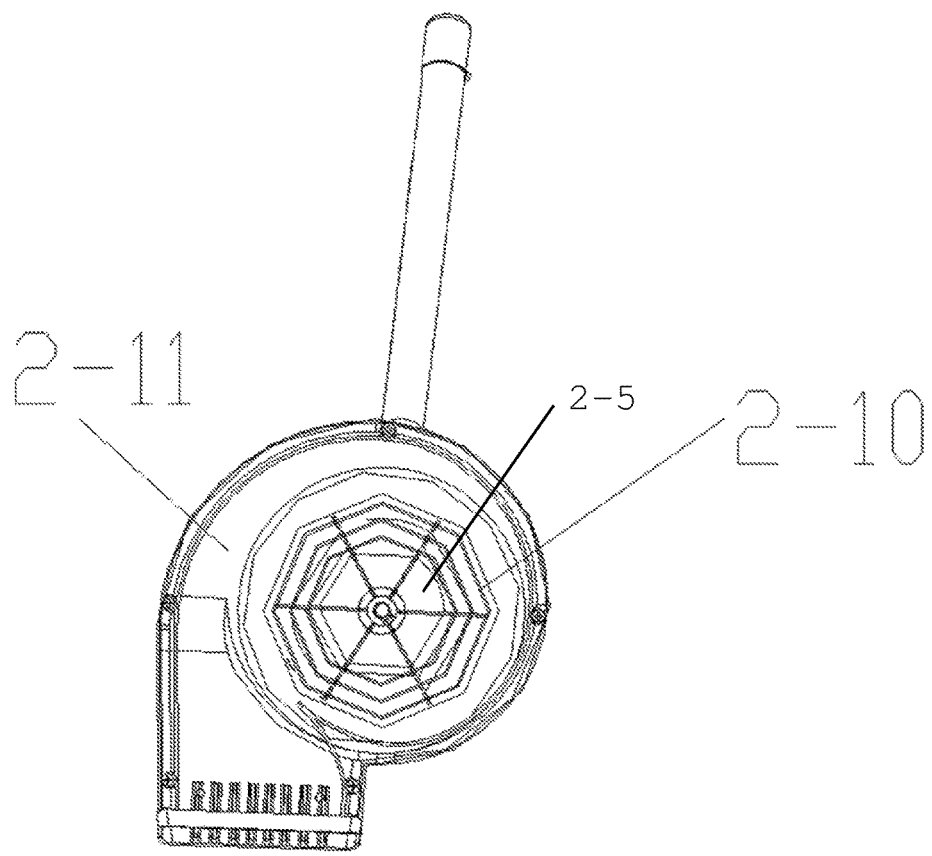
FIG. 12 is an upward view of the head of the leaf blower.
Figure 13:
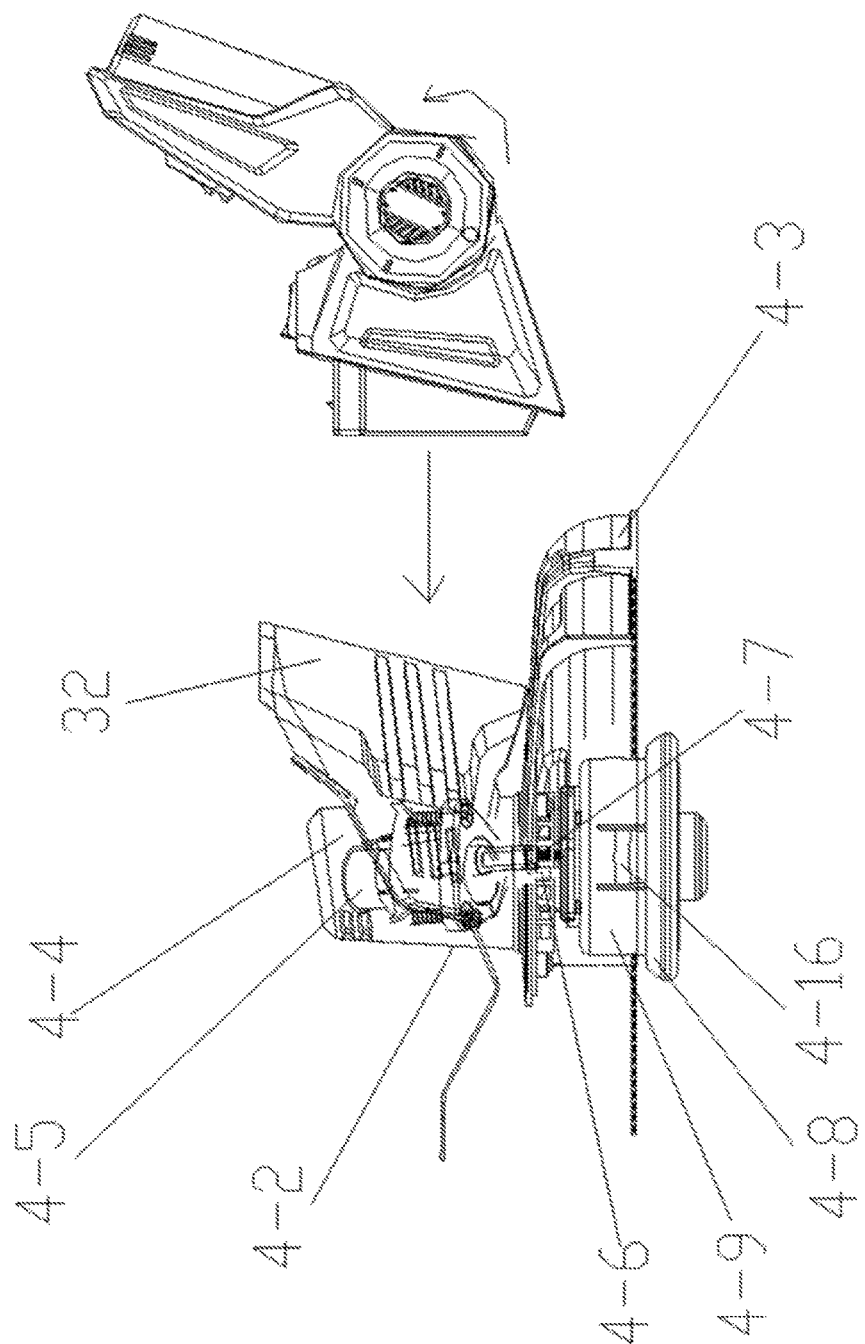
FIG. 13 is a structural diagram of a grass trimmer head.
Figure 14:
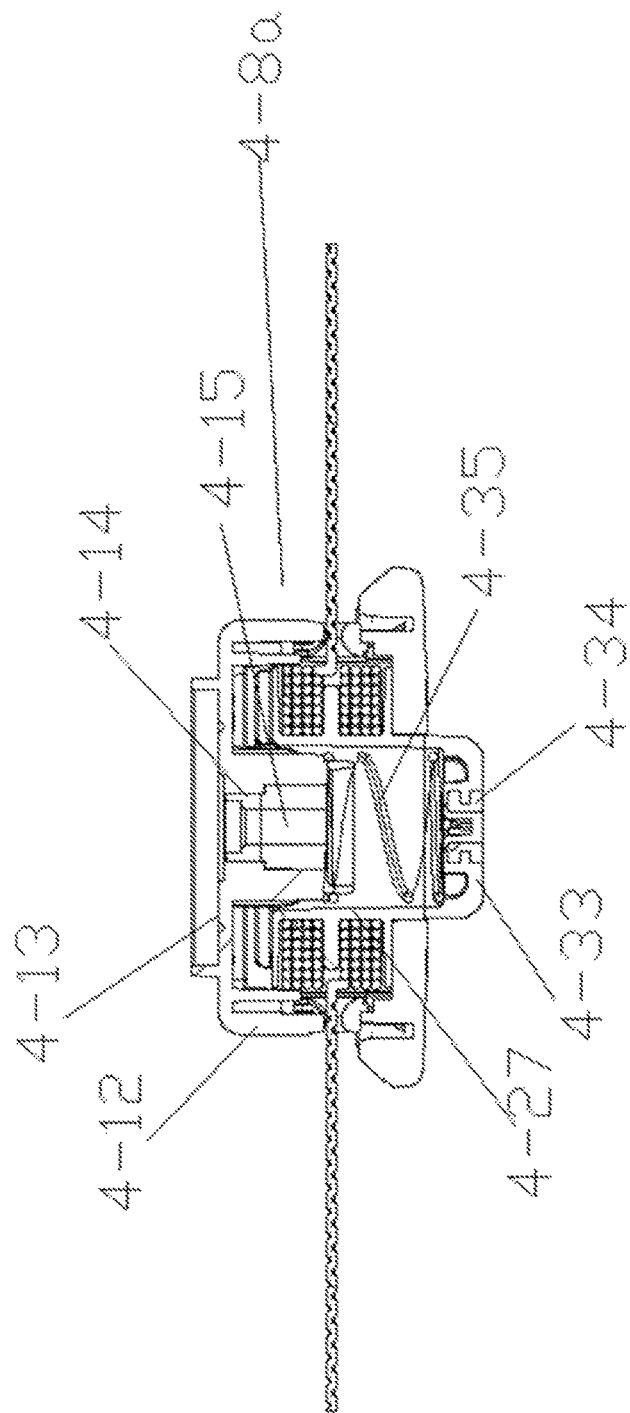
FIG. 14 is a structural diagram of a multicolor trimmer disk.
Figure 15:
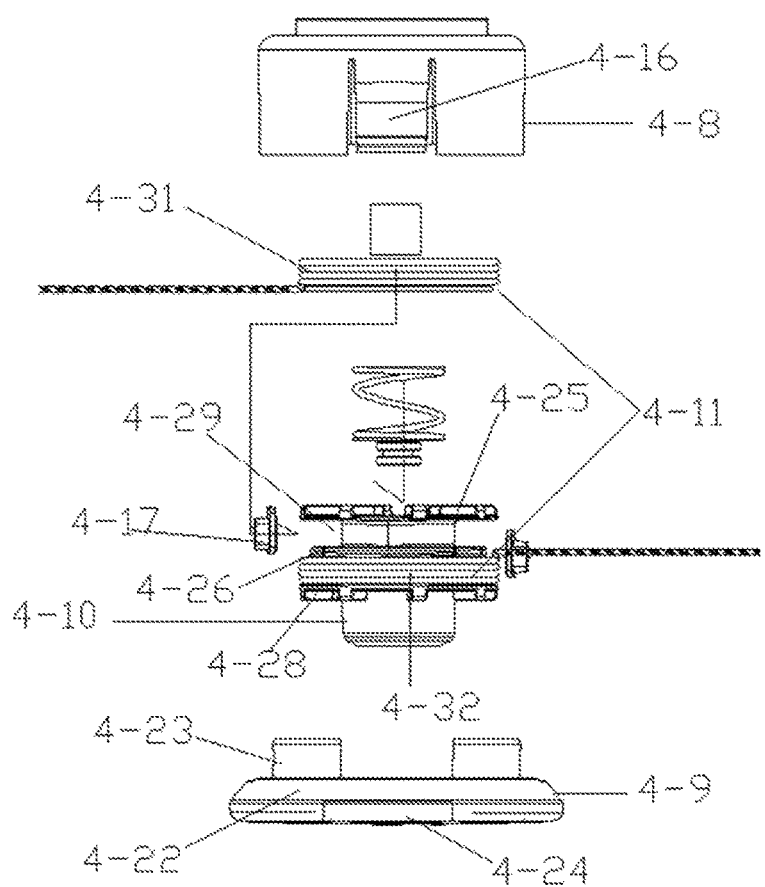
FIG. 15 is an assembly drawing of the multicolor trimmer disk.
Figure 16:
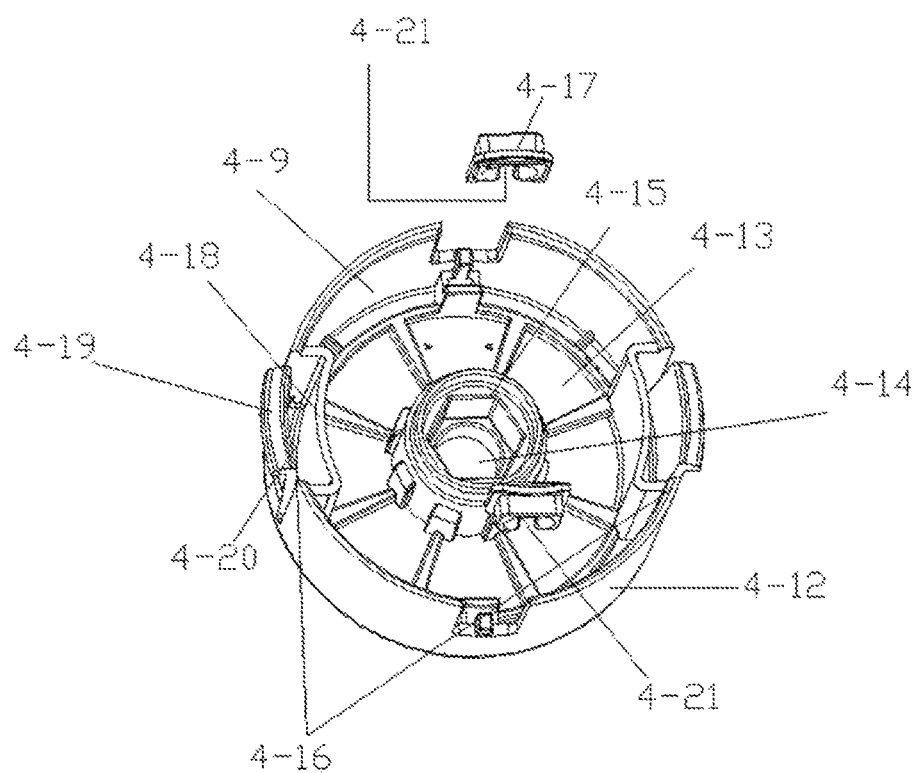
FIG. 16 is a diagram showing an accommodating base of the multicolor trimmer disk.
Figure 17:
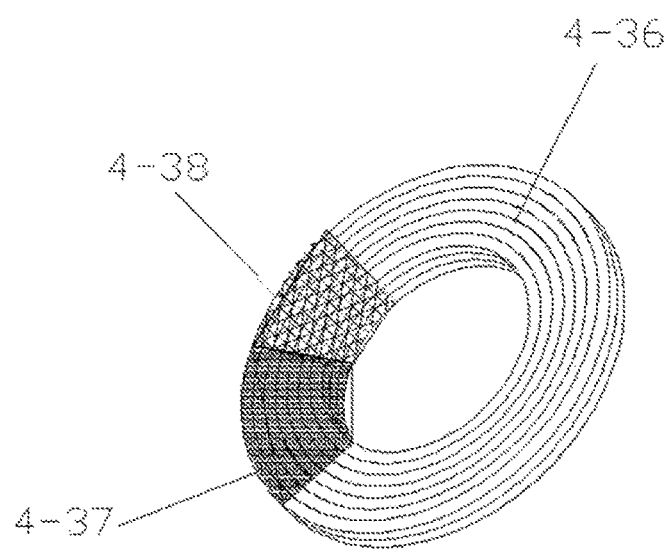
FIG. 17 is a first structural diagram of multicolor trimmer lines.
Figure 18:
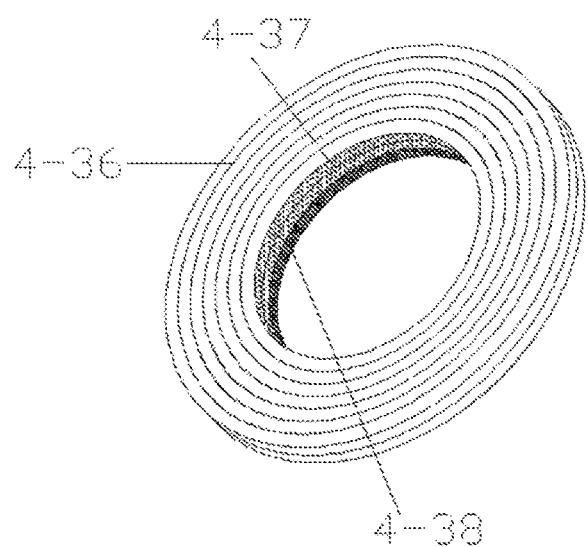
FIG. 18 is a second structural diagram of the multicolor trimmer lines.
Figure 30:
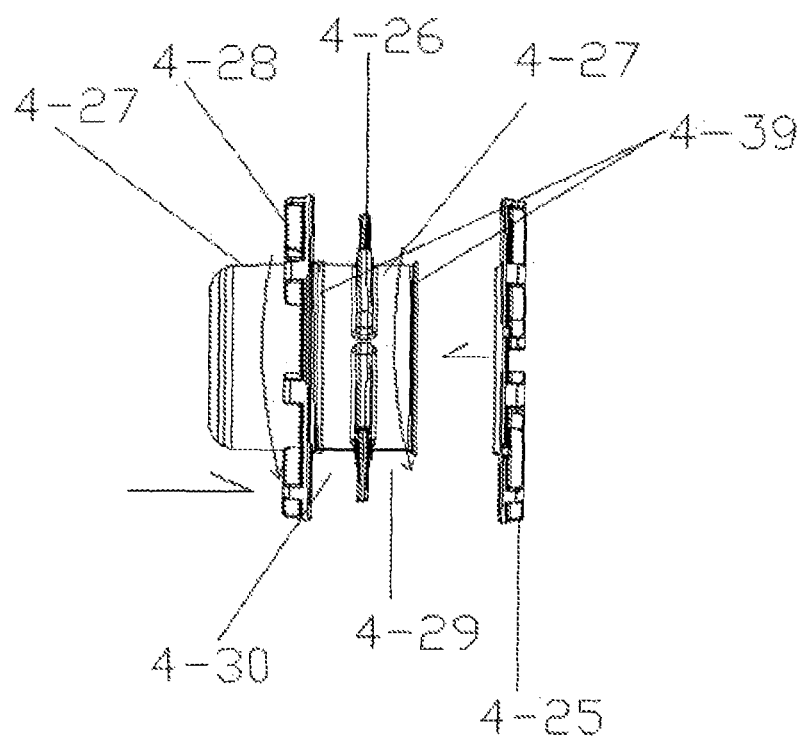
FIG. 30 is a diagram of an embodiment 2 of a coil of the leaf blower head.

As shown in FIG. 1 to FIG. 5, a multi-purpose portable gardening tool with multiple heads and combinations is provided, including a main machine body 1, a function head 2, an extension tube 3, an extension intermediate head 4 and a function intermediate head 5; the function head 2 or the extension intermediate head 4 is in spigot joint with a head end of the main machine body 1, a head end of the extension intermediate head 4 is connected to the extension tube 3 having the function intermediate head 5 disposed at a head end thereof, and the function head 2 is in spigot joint with a head end of the function intermediate head 5;

A power supply cord or a mild steel wire drive shaft 9-1 is disposed in the extension tube 3, a crankshaft sleeve 9-2 is disposed at a head end of the mild steel wire drive shaft 9-1, a connecting shaft core 9-3 is disposed at a tail end of the extension tube 3, and power output shafts of the crankshaft sleeve 9-2 and the main machine body 1 or power input gears or screws of an extension intermediate head 4 are engaged with each other;

As shown in FIG. 3, the main machine body 1 includes a grip handle 6 and a mobile battery pack 7, insertion chutes 8 and electrically connected PIN connectors 9 are disposed on the top of the mobile battery pack 7, battery slots 10 are disposed at the bottom or a tail end or both bottom and tail end of the grip handle 6, main machine body wiring PINs 11 are disposed in the battery slots 10, the insertion chutes 8 of the mobile battery pack 7 are in spigot joint with the battery slots 10, the electrically connected PIN connectors and the main machine body wiring PINs 11 are integrally fastened with each other, and the mobile battery pack 7 is connected to the grip handle 6;

An extension junction 12 which is provided with an extension chute 13 is further disposed at a head end of the grip handle 6, and the extension chute 13 is provided with an extension electric PIN connector 14 inside and further provided with a fastening device 15; the main machine body 1 is in spigot joint with the insertion chute 38 of the connection machine head 32 through the insertion chute 8 of the grip handle 6 so that the fixed connection relation between the main machine body 1 and the connection machine head 32 is strengthened on the side face through the fastening device 15;

The extension intermediate head 4 includes an extension end 16 and a main machine end 17, and the shape of the extension end 16 is matched with that of the extension tube 3; a rear insertion sleeve 18 is disposed at a head end of the extension intermediate head 4 and a driven insertion chute 19 which is inserted into the insertion chute 8 in a matching manner is disposed at tail end thereof, and a driven PIN connector 20 matched with the electrically connected PIN connector 9 is disposed on the driven insertion chute 19; the extension tube 3 is inserted into the rear insertion sleeve 18, the driven insertion chute 19 and the insertion chute 8 are in spigot joint with each other in a sliding manner, and electric connection is formed between the main machine 1 and the extension intermediate head 4 after the driven PIN connector 20 and the electrically connected PIN connector 9 are fastened with each other;

The extension tube 3 at least includes tube bodies 21 and a tube adapter 22, a head end of each tube body 21 is inserted into the rear insertion sleeve 18 of the extension intermediate head 4 and a tail end thereof is inserted into the front insertion sleeve 23 and connected to the function intermediate head 5, and a connection of spigot joint between any two tube bodies 21 is strengthened by the adapter sleeve 22;

As shown in FIG. 5, the function intermediate head 5 includes a function head junction 24, a turning support 25, a circular rotation shaft 26, a control unit 27 and a front insertion sleeve 23, the turning support 25 which rotates around the circular rotation shaft 26 is disposed in the front of the circular rotation shaft 26 and provided with a function connecting PIN 29 which is integrally formed with and protruded on a head of the turning support 25, and function head connecting chutes 30 are respectively disposed on left and right outer edges of the function connecting PIN 29; the control unit 27 is fixedly disposed behind the circular rotation shaft 26 and fixedly connected to the same without rotation, and a function head start button 31 is disposed on the top or an outer side of the control unit 27, and the front insertion sleeve 23 which is integrally formed with the control unit 27 is disposed on the bottom of the control unit 27, and a tail end of the tube body 21 is inserted into the front insertion sleeve 23;

As shown in FIG. 2, the function head includes a connection machine head 32 and a function machine head 33, the function machine head 33 includes a chain saw function head 34, a grass trimmer function head 37, a bush saw head 36 and a leaf blower head 35, and the function machine head 33 is integrally provided with the connection machine head 32; an insertion chute 38 is outwardly disposed on the connection machine head 32, the insertion chute 38 is connected to the function head connecting chutes 30 of the function head 2 junction and also provided with a drive PIN connector 39, and the drive PIN connector is fastened with the function connecting PIN to form an electric connection;

As shown in FIG. 6 to FIG. 8, the chain saw function head 34 includes the connection machine head 32, a motor power unit 1-1 and a chain saw blade 1-2, an upper handle 1-3 and a control handle 1-4 are disposed at the top of the motor power unit 1-1 and a sub-end slot 1-5 is disposed at a tail end thereof;

A drive motor 1-6, a drive shaft of which is connected to the chain saw blade 1-2, is disposed in the motor power unit 1-1, and a brake neck 1-7 is disposed at a tail end of the chain saw blade 1-2; the drive motor 1-6 is provided with an emergency brake module 1-8 which is connected to the drive motor 1-6 and the control handle 1-4 respectively and includes a brake 1-9, a control circuit 1-10, a handle control circuit 1-11 and a circuit controller 1-12, and the circuit controller 1-12 is electrically connected to the control circuit 1-10; one end of the brake 1-9 is electrically connected to a power supply port 1-13 of an adopter through the control circuit 1-10 and the other end thereof is provided with the handle control circuit 1-11 electrically connected to the control handle 1-4 in an opening-closing manner, the control handle 1-4 includes a handle body 1-14 having a brake torsion spring 1-15 disposed at the root thereof, a tumbler 1-16 having a split brake reed 1-17 disposed on the bottom thereof is disposed on the bottom of the brake torsion spring 1-15, one end of the split brake reed 1-17 is connected to the drive motor 1-6 and the other end is connected to a safety circuit 1-18; the split brake reed 1-17 is splayed, and a toggle contact switch 1-19 is disposed at an upper end of a tail of the split brake reed 1-17; a control handle groove 1-20 is disposed on a head at a top end of the motor power unit 1-1, the control handle 1-4 is inserted into the control handle groove 1-20 and fixed in the motor power unit 1-1 by the brake torsion spring 1-15, the control handle groove 1-20 includes a left slotted piece 1-21 and a right slotted piece 1-22, a limit piece 1-23 is disposed on an outer side of the brake torsion spring 1-15 of the control handle 1-4, and a triangle top 1-24 is disposed in the center of the split brake reed 1-17;

As shown in FIG. 10 to FIG. 12, the leaf blower head 37 includes a drive elbow tube 2-1, an air inlet power unit 2-2 and an air duct tube 2-3; the mild steel wire drive shaft is sleeved in the drive elbow tube 2-1, and the air inlet power unit 2-2 includes a continuously variable transmission bearing 2-4 and an air rotor 2-5 which is inserted into the continuously variable transmission bearing 2-4, a bottom of the air rotor 2-5 is connected to a turbofan 2-6, a turbofan housing and a turbine disc 2-7 of the air duct tube 2-3; the 9-shaped turbofan housing 2-8 is provided outside the turbofan 2-6 to form a turbine air duct 2-9 between the two; an air inlet hemisphere 2-10 is disposed on the bottom of the turbine disc 2-7, a reverse-turbine air duct 2-11 is reversely disposed around the air inlet hemisphere 2-10 and the 9-shaped turbofan housing 2-8, and splitter dampers 2-12 are disposed at a head end of the turbine air duct 2-9;

As shown in FIG. 3, the bush saw head 36 includes the connection machine head 32 and a main bush saw 3-1, the connection machine head 32 is disposed at a tail end of the main bush saw 3-1 which is covered by a bush saw housing 3-2 and provided with a saw motor 3-3 inside, the saw motor 3-3 is disposed on a motor base 3-4 having a drive wheel 3-5 disposed at the bottom and a saw blade supporting guide rod 3-6 at a front end; a number of saw blades 3-7 spliced together are disposed in a saw blade slot, a tow line 3-8, which is hinged on the drive wheel 3-5, is disposed at a tail end of the saw blade 3-7, and the bush saw housing 3-2 is provided with a front pressure baffle 3-10 at a front end of a rotary handle 3-9, detachable metal pressure rods, head ends of which are crimped onto multistage compression legs 3-11 disposed at a head end of the saw blade supporting guide rod 3-6, are disposed in front of the pressure baffle 3-10;

As shown in FIG. 13 to FIG. 18, the grass trimmer function head 2 includes the connection machine head 32 and a main grass trimmer 4-2 including a semi-arc housing 4-3, a grass trimmer drive unit 4-4, which extends outwardly to be provided with the connection machine head 32, is disposed on the top of the semi-arc housing 4-3; a grass trimmer motor 4-5 is disposed in the grass trimmer drive unit 4-4, and a grass trimmer shaft 4-6 of the grass trimmer motor 4-5 is exposed from a driving hole 4-7 on the top of the semi-arc housing 4-3 by passing over the semi-arc housing 4-3 and is in screwed connection with a multicolor grass trimmer head 4-8 which includes an accommodating base 4-8a, a shrink disk 4-9, a coil 4-10 and a head cover 4-13, having a mounting hole 4-14 disposed at a position where an axis thereof is located, is disposed on the top of a bowl-shaped tube 4-12 of the accommodating base 4-8a, the mounting hole 4-14 is in screwed connection with the grass trimmer shaft 4-6, and an idler shaft 4-15 is provided below the mounting hole 4-14;

A pair of cover rotation clips 4-16 are disposed on a lateral axis of the bowl-shaped tube 4-12 and a line end clip 4-17 is disposed on a vertical axis thereof, the cover rotation clips 4-16 consist of ]-shaped concave pieces 4-18 and cramps 4-19 in front of the concave pieces, catching grooves are formed between the concave pieces 4-18 and the cramps 4-19, and an eyelet hole 4-21 is disposed in the line end clip 4-17;

The shrink disk includes a chassis 4-22 and splicing pieces 4-23 disposed on the chassis 4-22 vertically and upwardly, a coil bottom mounting hole 4-24 is disposed at a position where an axis of the shrink disk 4-9 is located, and the splicing pieces 4-23 are clamped into the catching grooves 4-20;

As shown in FIG. 30, The coil 4-10 includes top fasteners 4-25, a spacer 4-26, a coil column 4-27 and bottom fasteners 4-28, the top fasteners 4-25 are disposed at the top of the coil column 4-27 and the bottom fasteners 4-28 are disposed at a tail end thereof; the top fasteners 4-25 and the spacer 4-26 form an upper bale tray 4-29, the coil column 4-27 and the bottom fasteners 4-28 form a lower bale tray 4-30, and the trimmer line set is sleeved in the upper bale tray 4-29 and the lower bale tray 4-30;

The trimmer line set is a winding line or line coil assembly and at least includes an upper line coil assembly 4-31 sleeved in the upper bale tray 4-29 and a lower line coil assembly 4-32 sleeved in the lower bale tray 4-30;

The coil column 4-27, having a sealing head 4-33 on the bottom thereof, is a hollow tube inside, a pay-off snap ring 4-34 is tightly disposed above the sealing head inside the tube body of the coil column 4-27 and is sleeved with a pay-off spring 4-35 with a top resisting against the shrink disk 4-9; and The fastening device 15 is a top fastening device 5-1, or an internal pressure fastening device 6-1, or a lateral fastening device 7-1.

Figure 19:
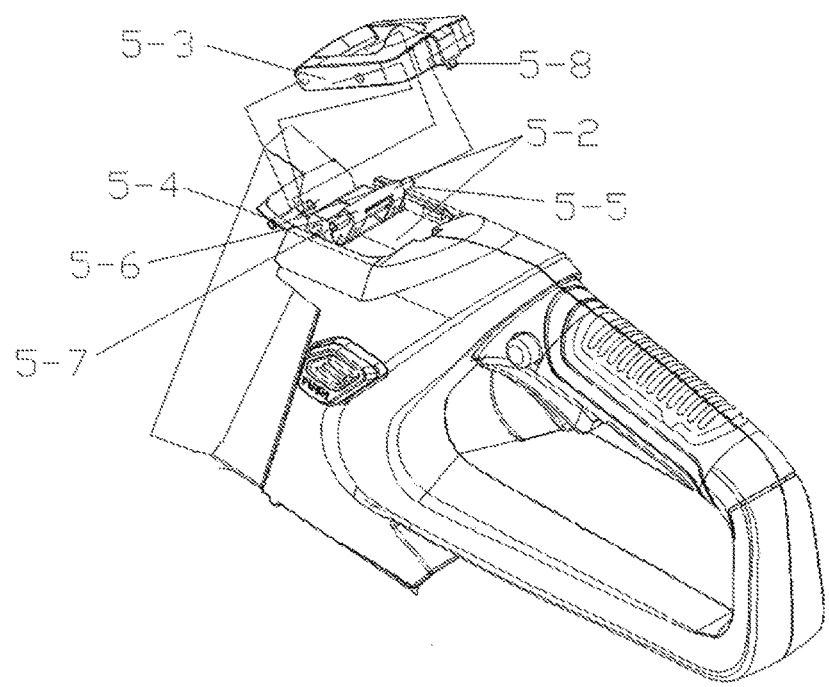
FIG. 19 is a diagram of a top fastening device.

As shown in FIG. 19, the top fastening device 5-1 includes connection fixing grooves 5-2 disposed at the top of the connection machine head 32 and the extension junction 12, a trigger buckle 5-3 is disposed in the connection fixing grooves 5-2 having a trigger fixed shaft 5-4 disposed at a head end or a tail end thereof, the trigger fixed shaft 5-4 is inserted into a tail end of the trigger buckle 5-3, the trigger buckle 5-3 rotates around the trigger fixed shaft 5-4, and a lock shaft 5-5 is disposed in the middle of the trigger buckle 5-3; a lock plate 5-6 is in spigot joint with the lock shaft 5-5, an L-shaped buckle holder 5-7 is disposed in the middle of the connection fixing grooves 5-2, the lock plate 5-6 is fastened into the L-shaped buckle holder 5-7, and a safety switch press button 5-8 is disposed at a head end of the trigger buckle 5-3.

Figure 20:
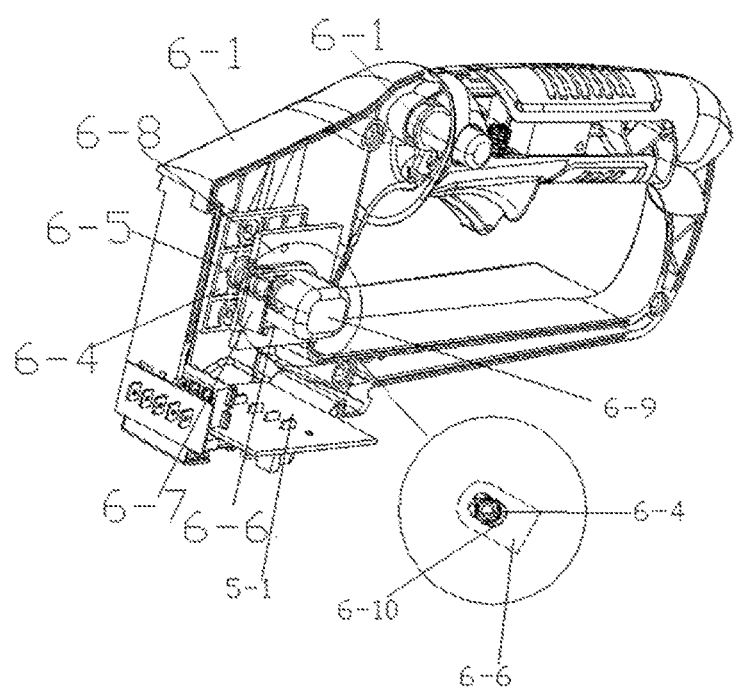
FIG. 20 is a diagram of an internal pressure fastening device.
Figure 21:
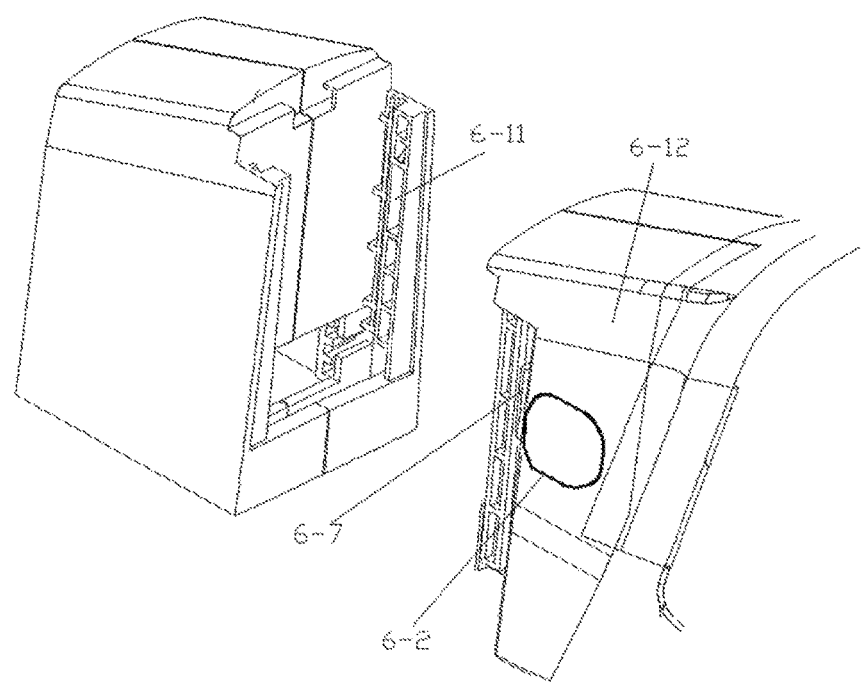
FIG. 21 is a connection diagram of a pressure fastening device.
Figure 22:
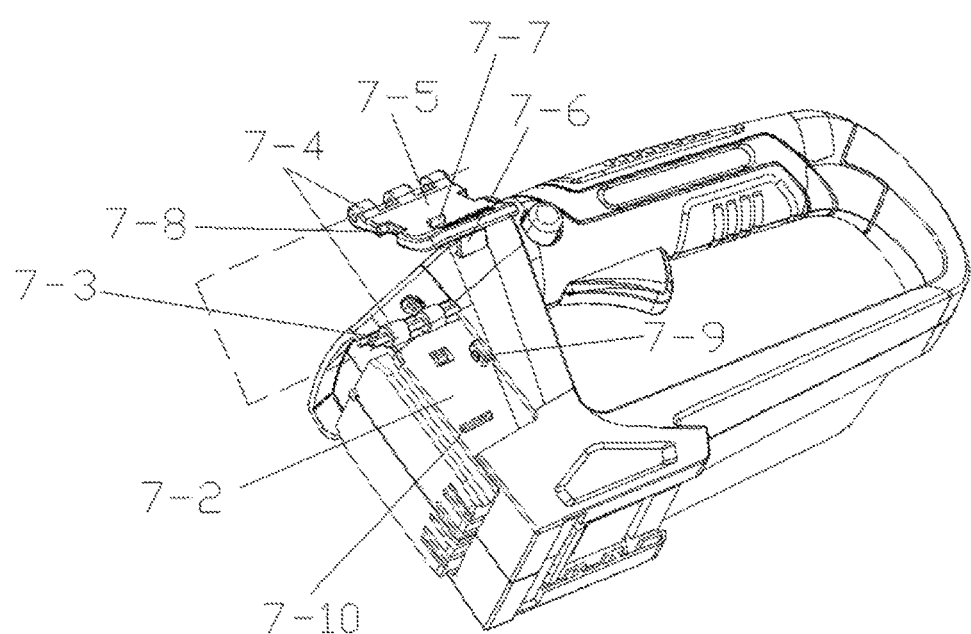
FIG. 22 is a diagram of a lateral fastening device.
Figure 23:
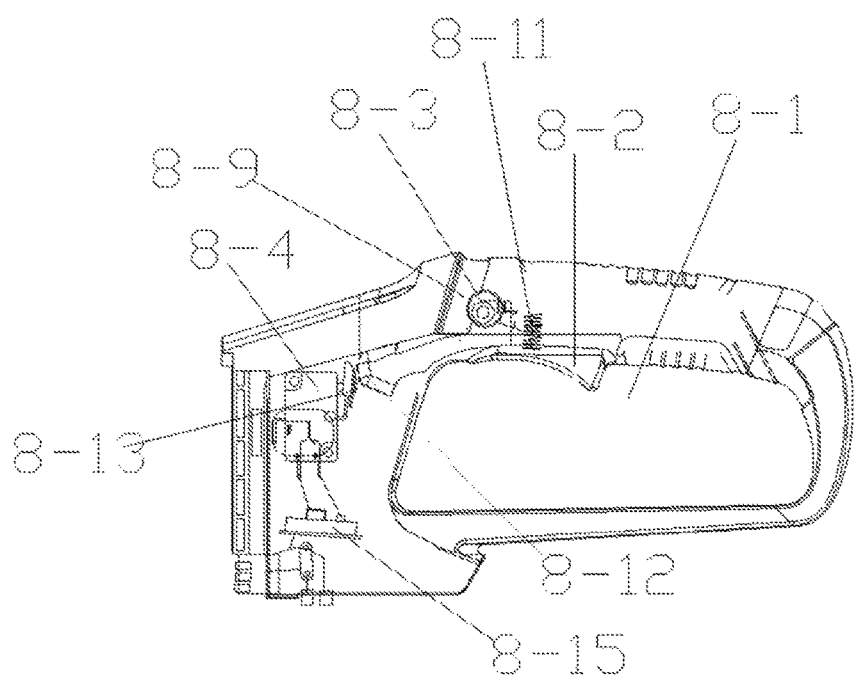
FIG. 23 is a structural diagram of an intermittent trigger switch.
Figure 24:
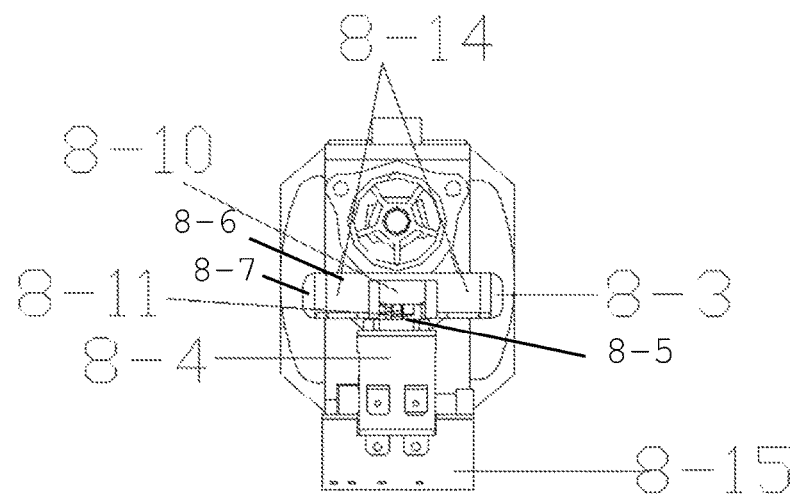
FIG. 24 is a structural sectional view of the intermittent trigger switch.
Figure 25:
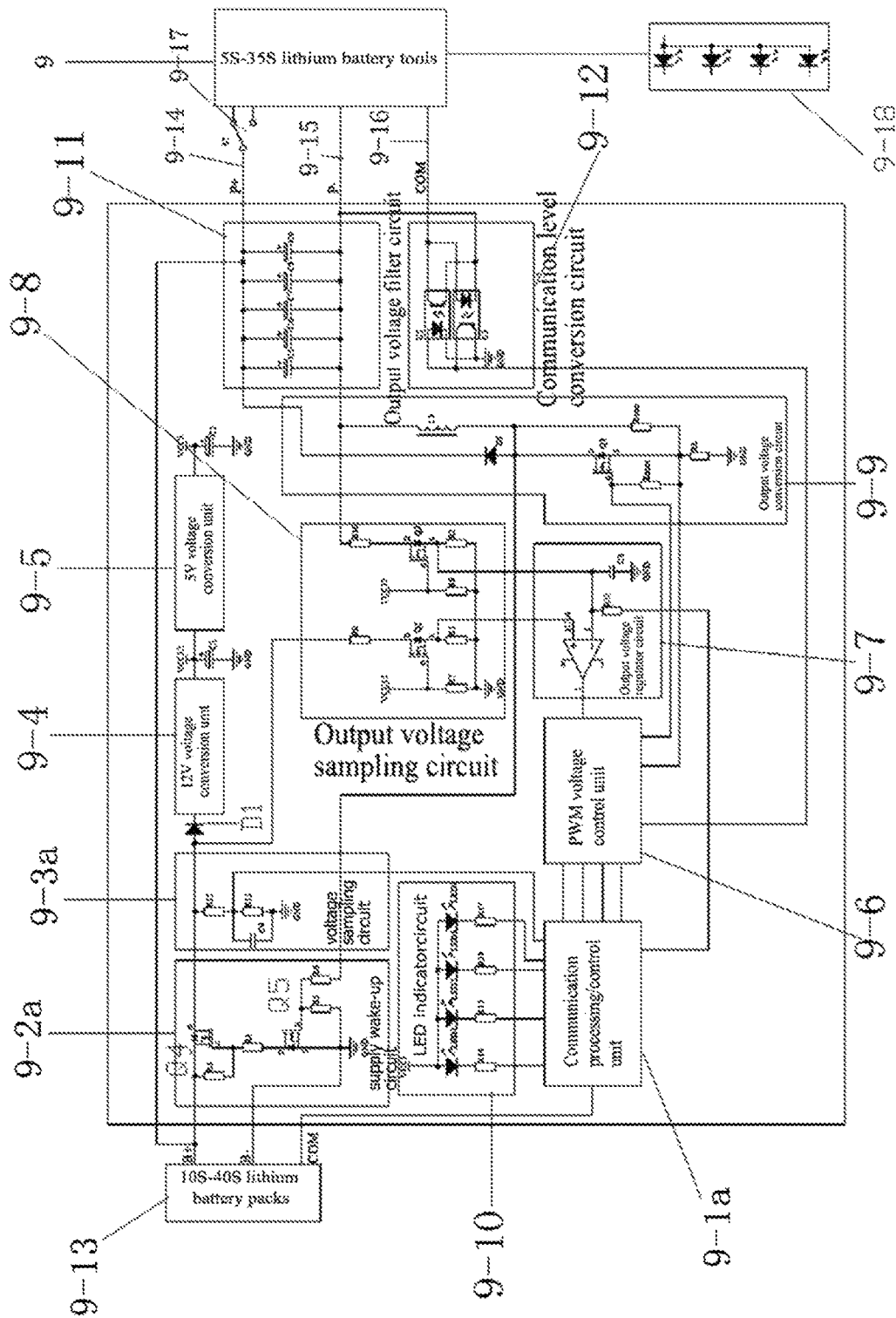
FIG. 25 is a circuit diagram of a voltage compatible controller.

As shown in FIG. 20 to FIG. 21, the internal pressure fastening device 6-1 is disposed in the extension junction 12, and a button hole 6-2 is disposed on an outer wall of a maim machine head housing 6-12 close to the extension chute 13; the internal pressure fastening device 6-1 includes a reaction fixed plate 6-4, a reset spring 6-5, and a pressure piece 6-6 which includes a tongue piece 6-8 and a fixed plate 6-7, a button 6-9 is protruded on the fixed plate 6-8 which is in screwed connection with the maim machine head housing 6-12 through screws, a hollow cavity 6-10 inside an opposite side of the button 6-9 is fixedly provided with the reset spring 6-5, and the reaction fixed plate 6-4 is resisted against the bottom of the reset spring 6-5; the L-shaped tongue piece 6-7, which is disposed at a position where the tongue buckle hole is located, straightly extends toward the extension chute 13; tongue piece catching grooves 6-11, matched with the tongue piece 6-7, are disposed on the insertion chute 38 of the function machine head 33 and the insertion chute 8 of the extension intermediate head 4, the function head 33 or the extension intermediate head 4 is in spigot joint with the extension chute 13 to press the tongue piece 6-7 until the tongue piece 6-7 is fastened into the tongue piece catching groove 6-11, and structures of the internal pressure fastening devices 6-1 mirror-symmetrical are disposed on both sides of the maim machine head housing 6-12;

As shown in FIG. 22, the lateral fastening device 7-1, including a rotary shaft 7-3, a rotary shaft clip 7-4 and a lateral cramp 7-5, is disposed in a lateral fastening groove 7-2 on a side face of the connection machine head 32, or on a side face of the maim machine head housing 6-12; the rotary shaft clip 7-4 is disposed on a housing of the lateral fastening groove 7-2; after being sleeved in the rotary shaft 7-3, the lateral cramp 7-5 is fixed on the rotary shaft clip 7-4, the rotary shaft 7-3 is also sleeved in the rotary shaft clip 7-4, and the rotary shaft 7-3 and the lateral cramp 7-5 are both joined by the rotary shaft clip 7-4; a presser 7-7 is disposed above and matched to an L-shaped buckle tongue 7-6 which is disposed on the bottom of an inner side of the lateral cramp 7-5; a safety switch, a trigger switch of which is disposed in the lateral fastening groove 7-2 to match with a pressing position of the presser 7-7, is disposed in the main machine head; a buckle notch 7-8 is disposed on each of left and right side faces of the lateral cramp 7-5, a side button 7-9 matched with the buckle notch 7-8 is disposed in the lateral fastening groove 7-2, and a lateral fixed neck 7-10 matched with the L-shaped buckle tongue 7-6 is disposed in the lateral fastening groove 7-2 at a pressing-down position;

As shown in FIG. 23 and FIG. 24, an intermittent trigger switch 8-2 is disposed in a handle groove 8-1 of the grip handle 6 and includes a transverse shifter 8-3, a safety switch 8-4 and a tangential dynamic trigger 8-5, the transverse shifter 8-3 includes a walking shaft 8-6 and a walking stopper 8-7, the walking shaft 8-6 at a head end of the walking stopper 8-7 is matched with and suspended in a safety mounting hole 8-9 of the handle shell, a notch 8-10 is disposed in the middle of the walking shaft 8-6, a reset spring 8-11 is disposed above the tangential dynamic trigger 8-5 which is staggered with the safety switch 8-4, and a shifting block 8-12 resisted against an elastic contact piece 8-13 of the safety switch 8-4 is disposed at a head end of the tangential dynamic trigger 8-5; the structural shape of the elastic contact piece 8-13 is matched with that of the tangential dynamic trigger 8-5, a section of the tangential dynamic trigger 8-5 is U-shaped and provided with trigger slots, the walking stopper 8-7 is downwardly provided with left and right stoppers 8-14 matched with the trigger slots, and the safety switch is electrically connected to a voltage compatible controller 8-15 and a trigger switch;

As shown in FIG. 25, the voltage compatible controller 8-15 is electrically connected to an LED indicator drive module 8-16 assembled by batteries through the main machine wired PINs 11 of the mobile battery pack 7;

The voltage compatible controller 8-15 is also electrically connected to the electrically connected PIN connector 9 of the main machine and the main machine wired PINs 11 in the battery slots 10, and connected to the main machine 1 to form an electric circuit;

The voltage compatible controller 8-15 includes a communication control processing unit 9-1a, a supply wake-up circuit 9-2a, a voltage sampling circuit 9-3a, a 12V voltage conversion unit 9-4, a 5V voltage conversion unit 9-5, a PWM voltage control unit 9-6, an output voltage regulator circuit 9-7, an output voltage sampling circuit 9-8, an output voltage conversion circuit 9-9, an LED display circuit 9-10, an output voltage filter circuit 9-11, a communication level conversion circuit 9-12 and rechargeable battery series 9-13; the main machine wired PIN is provided with a P+ line 9-14, a P− line 9-15 and a COM line 9-16 downwardly, a safety switch 9-17 of the compatible controller is disposed on the P+ line, a lower end of the P+ line 9-14 is connected to a positive pole of the output voltage filter circuit, and the P− line is connected to a negative pole thereof and also connected to the communication level conversion circuit, and the COM line is also connected to the communication level conversion circuit; the communication level conversion circuit is provided with an output circuit A connected to the voltage sampling circuit, and also provided with a resistor circuit connected to the P− line in series, the P− line is connected to the output voltage sampling circuit after passing through the communication level conversion circuit; the output voltage sampling circuit is provided with a circuit B electrically connected to a B+ line which is provided with the voltage conversion unit at an upper end of a joint on the B circuit; the voltage conversion unit includes the 12V voltage conversion unit and the 5V voltage conversion unit which are connected in series; the B+ line is provided with the voltage sampling circuit on a lower end line of the joint of the B circuit and then provided with the supply wake-up circuit, the supply wake-up circuit is connected to the B+ line and a B− line, the B+ line and the B− line are connected to positive and negative poles of the mobile battery pack at a tail end, and the mobile battery pack is also provided with the COM line which is connected to the communication processing and control unit; the communication processing and control unit includes the LED indicator drive module 8-16 and the PWM voltage control unit, the PWM voltage control unit is connected to the output voltage regulator circuit, the output voltage conversion circuit and the communication level conversion circuit, and the electrically connected PIN connector is also provided with battery anti-reverse chips 9-18 connected in series.

Figure 26:
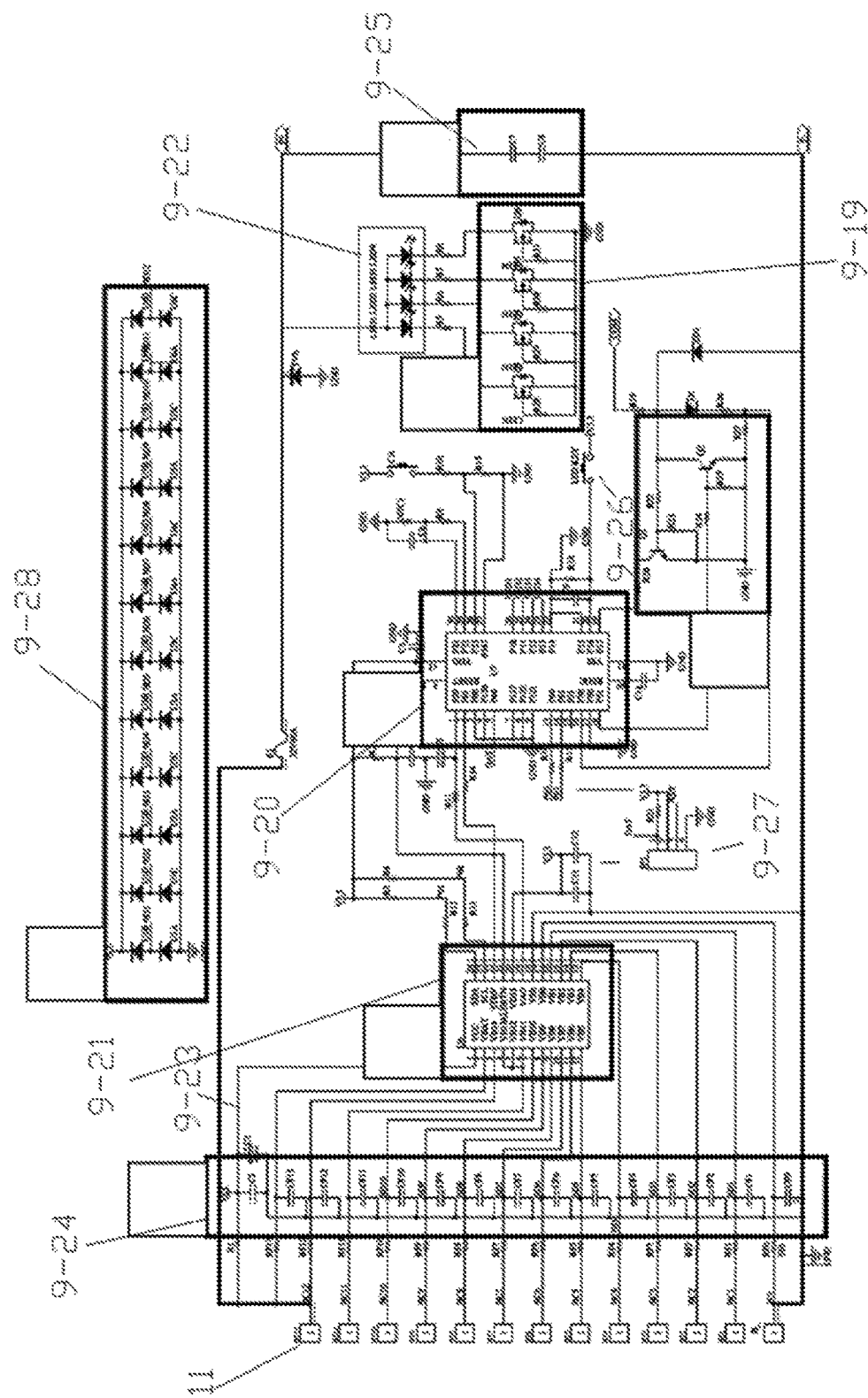
FIG. 26 is a diagram of an LED indicator drive module.
Figure 27:
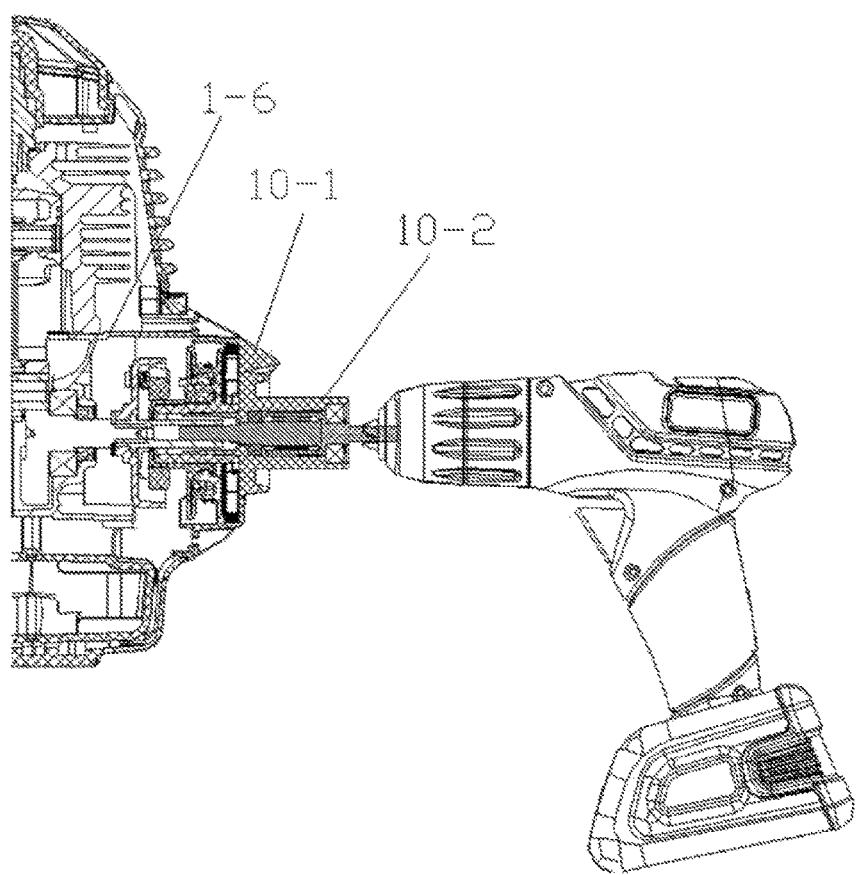
FIG. 27 is a structural diagram of a motor power unit provided with a relay starter.
Figure 28:
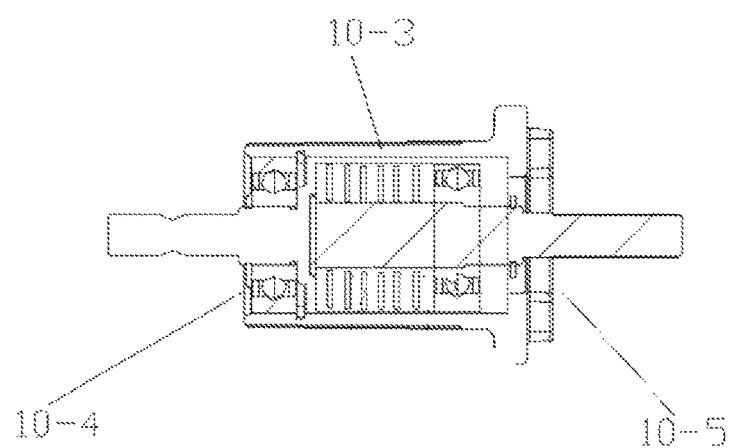
FIG. 28 is a structural diagram of the relay starter.
Figure 29:
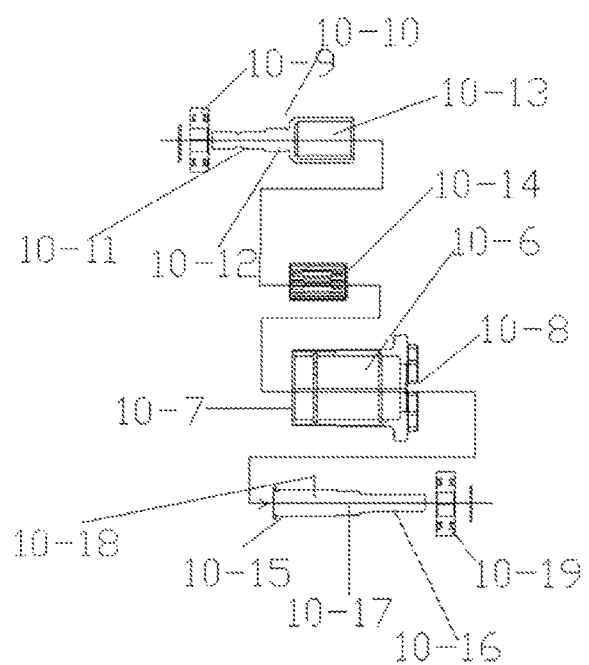
FIG. 29 is a structural diagram of a connection machine head.

As shown in FIG. 26, the LED indicator drive module 8-16 is disposed on the PIN of the mobile battery pack or the mobile battery pack 7, and includes a lamp drive unit 9-19, a control unit 9-20, a single battery sampling unit 9-21 and an LED lamp bank 9-22; a lower end of the LED lamp bank 9-22 is electrically connected to the lamp drive unit 9-19 which is in control connection with the single battery sampling unit 9-21 by a control line disposed on the control unit, the single battery sampling unit 9-21 is provided with a sampling line 9-23 electrically connected to the main machine wired PINs 11, and the mobile battery pack 7 is provided outside the main machine wired PINs 11;

Output filter elimination capacitors 9-24, which are electrically connected to the lamp drive unit 9-19, the single battery sampling unit 9-21 and output filter elimination capacitors 9-25, are also disposed between the LED lamp bank 9-22 and the lamp drive unit 9-19;

The control unit 9-20 includes a control unit chip and a communication control triode, a head end of the communication control triode is electrically connected to the control unit chip and a tail end thereof is divided into two electric connection branches respectively connected to the output filter elimination capacitors and a filter capacitor bank, and electric connection branches of the filter capacitor bank are further electrically connected to the main machine wired PINs; an LED lamp switch control switch 9-26 is disposed between the control unit and the lamp drive unit; a memory chip 9-27 is also bridged between the single battery sampling unit and the control unit; a battery anti-reverse diode 9-28 is also disposed between the single battery sampling units;

As shown in FIG. 27 to FIG. 29, preferably, the saw motor 3-3 or the drive motor of the chain saw function head 34 or the main bush saw 3-1 is provided with a start connector 10-1 outside the housing, an inner starter is disposed in the start connector 10-2, including a housing 310, a power transfer end assembly 10-4 and a power output end assembly 10-5, a device tube seat 10-6 is disposed inside the housing, a power transfer end hole 10-7 and a power output end hole 10-8 are respectively formed on both sides of the device tube seat 10-6, a power transfer end assembly 10-4 and a power output end assembly 10-5 are inserted into the device tube seat 10-6;

The power transfer end assembly 10-4 includes a rolling bearing 10-9 and a power transfer shaft 10-10 on which the rolling bearing 10-9 is sleeved, the power transfer shaft 10-10 includes a power access head 10-11, a sealing center shaft 10-12 of the transfer shaft and a universal driving shaft tube 10-13 of the transfer shaft, the sealing center shaft 10-12 of the transfer shaft is disposed at a position where the power transfer end hole 10-7 is located, and a head end of the sealing center shaft 10-12 of the transfer shaft extends out of the power access head 10-11 from the device tube seat 10-6, the power access head 10-11 is exposed outside the housing, the universal driving shaft tube 10-13 of the transfer shaft is disposed in the device tube seat 10-6 in the power transfer end hole 10-7, the rolling bearing 10-9 is sleeved on the sealing center shaft 10-12 of the transfer shaft, and the one-way rolling bearing is a one-way needle bearing; and The power output end assembly 10-5 includes a one-way rolling bearing 10-14 and a power output shaft 10-15 which includes a power output head 10-16, a sealing center shaft 10-17 of the output shaft, a universal driving shaft 10-18 of the output shaft and an output end bearing 10-19; the sealing center shaft 10-17 of the output shaft is disposed at a position where the power output end hole 10-8 is located, and a head end of the sealing center shaft 10-17 of the output shaft extends out of the power output head 10-16, the power output head 10-16 is exposed outside the housing from the power output end hole 10-8, the output end bearing 10-19 is sleeved on the sealing center shaft 10-17 of the output shaft, and the one-way rolling bearing 10-14 is sleeved on the universal driving shaft 10-18 of the output shaft.

Preferably, the trimmer line set 4-11 at least includes green lines, yellow lines 4-37 and red lines 4-38 which are integrally formed by injection molding, and sorted by the green lines at a head end, the yellow lines at a middle end and the red lines at a tail end; or the arrangement of the green lines, the yellow lines and the red lines of the line coil assembly is the red lines on a last layer, the yellow lines on at least two lowest layers and the green lines on the other layers; or the arrangement of the green lines, the yellow lines and the red lines of the winding line is the red lines at the tail end of 1$m$, the yellow lines at the tail end of 2$m$ to 3$m$ and the green lines as the rest; the overall arrangement of the green lines, the yellow lines and the red lines of the line coil assembly from a top view is the green lines within an angle from 12 o'clock to 6 o'clock, the yellow lines within an angle from 6 o'clock to 9 o'clock and the red lines within an angle from 10 o'clock to 12 o'clock; and a fluorescent layer or fluorescent powder is coated on the surface of the trimmer line set 4-11.

Preferably, the top fasteners 4-25 and the bottom fasteners 4-28 are both annular bodies provided with coil threads inside, the coil column 4-27 is provided with threads 4-39 which are matched with the thickness of the trimmer line coil at upper and lower positions of the spacer 4-2, and the top fasteners 4-25 and the bottom fasteners 4-28 are in screwed connection with the coil column.

Figure 31:
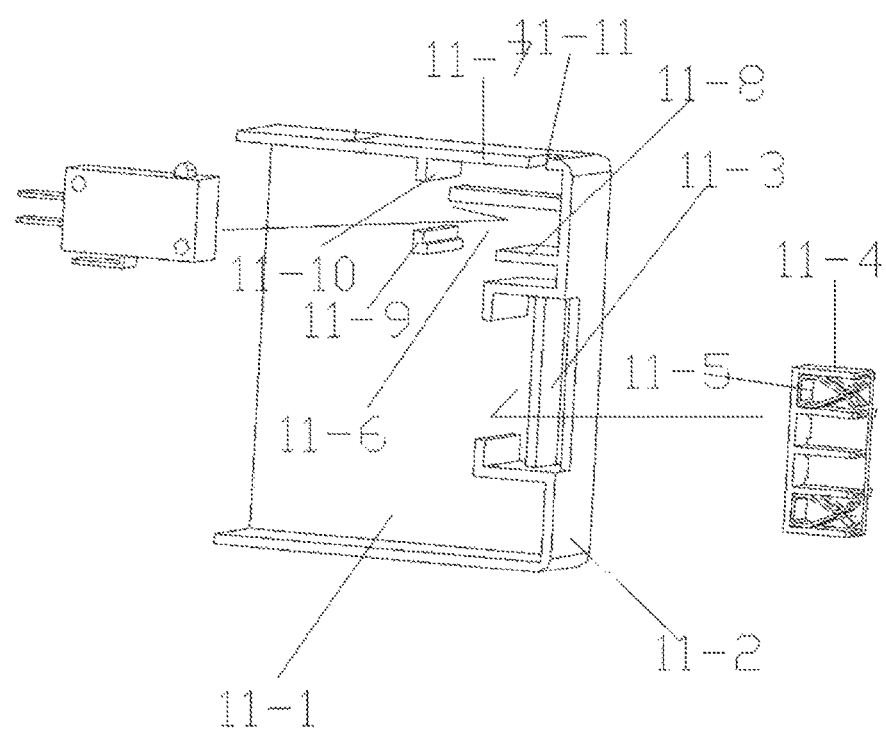
FIG. 31 is a connection machine head.

As shown in FIG. 31, preferably, the connection machine head 32 includes a connection adapter housing 11-1 having a connection wall 11-2 at a head end thereof, an electric connection jack slot 11-3, in which an electric connection jack 11-4 is disposed in, is disposed on the connection wall 11-2, and a number of electric connection insert holders 11-5 which are arranged side by side are disposed in the electric connection jack 11-4; a switch groove seat 11-6 is disposed on an upper side of the electric connection jack slot 11-3 and formed into a square by enclosing a sealing wall 11-7, an electric insert catching wall 11-8, a center block 11-9, a lateral pinch plate 11-10 and a sealing wall, and the sealing wall 11-7 is provided with a switch pressure hole 11-11.

Figure 32:
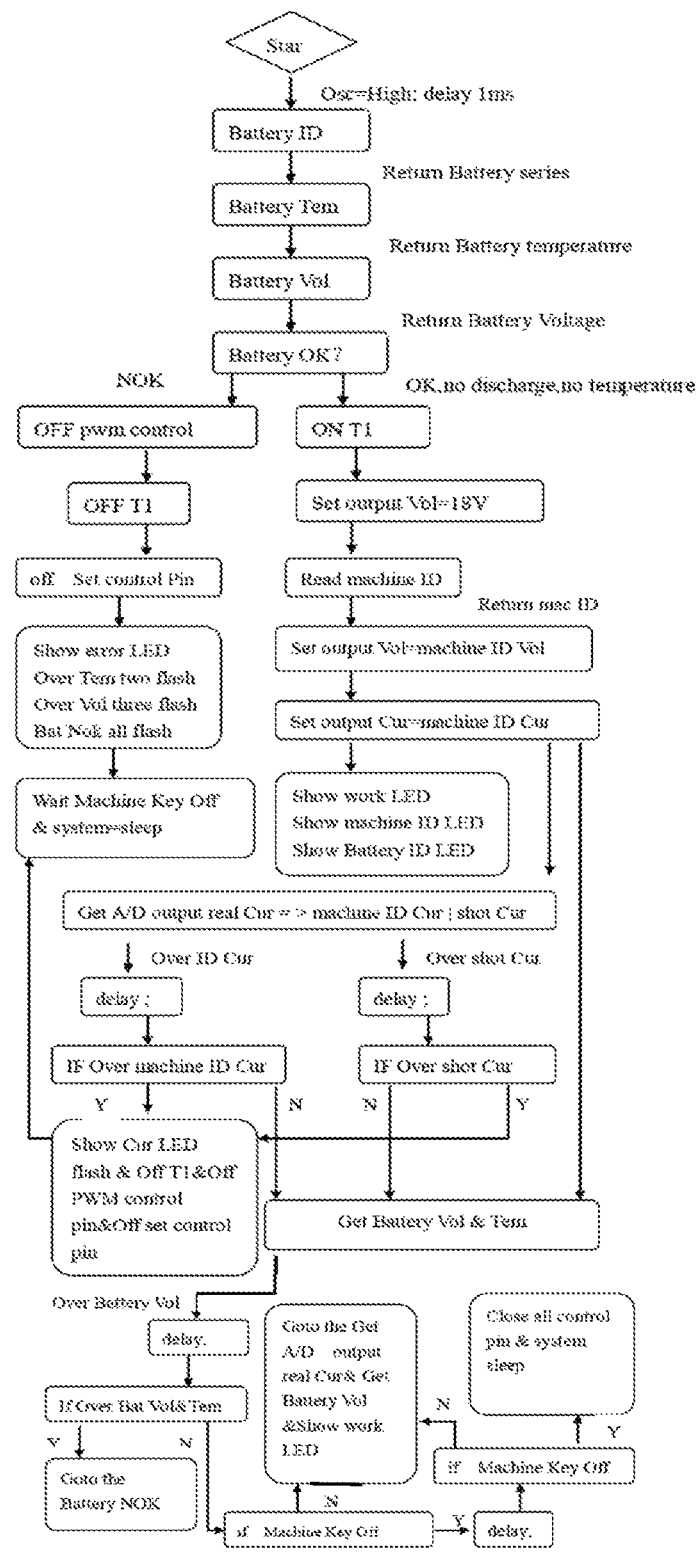
FIG. 32 is a logic control diagram when the gardening tool uses the voltage compatible controller.

As shown in FIG. 32, a detailed method of the multi-purpose portable gardening tool with multiple heads and combinations for using the voltage compatible controller is as follows: the whole portable gardening tool is assembled well and the mobile battery pack 7 which can be any of mobile battery packs with any series battery packs is in spigot joint with the grip handle 6 of the main machine, the function head 2 is directly connected to the function head junction of the main machine 1, or the extension tube 3 is inserted into the function head junction of the main machine 1 after the extension intermediate head 4 is inserted well, the head end of the extension tube 3 is inserted into the function intermediate head 5 into which the function head is inserted; all the fastening devices 15 are pressed down to switch on the safety switch of the PIN connector of each extension head, and finally a power switch of the main machine 1 is started to switch on all the electric circuits of the whole multi-purpose portable gardening tool with multiple heads and combinations. However, the function head 2 will not be started to run due to a master monitor button switch at the handle. At this moment, the voltage compatible controller 8-15 will begin to detect the whole electric circuits, and the detail detecting process is as follows:

1. When the mobile battery pack is detected, the communication chip of the mobile battery pack will feed the information back to the communication control processing unit of the voltage compatible controller to obtain at least information such as voltage, number of series and temperature of the mobile battery pack;

2. The voltage compatible controller forward detects the ID of the function head fed back from the control chipset of the function head, and reads the voltage data to obtain the rated voltage and the rated current required for starting the function head;

3. If the data fed back from the function head and the read voltage data are normal, continue to read current data; if the current data is also normal, turn on a work light (a running light of the whole machine), a battery identification light and a function head identification light in the LED lamp on the main machine head;

4. If the above two readings are normal, continue to read the output current of the A/D port; if the output current of the A/D port is greater than or equal to the current identified by the function head or the information fed back from the whole electric circuit that the circuit is shorted, wait to collect the identified current information of all function heads under the state of identifying all circuit normally; if all the information can be collected but the whole circuit is in a short-circuit condition, feed the information back to turn on a short-circuit light, flash and turn off the T1 light and turn off the PWM voltage control unit, turn off PIN connectors of all circuits, switch on and close the control pin, and finally turn off the safety switch of the whole machine and force the system to sleep;

5. If the identified data is normal, continue to read residual capacity and total capacity of the battery, continue to wait for the controller to read all the data of all the mobile battery packs (in case of many mobile battery packs), if the read data of all the battery packs is normal;

6. In case of reading that the switch of the main machine head is in an off state in all the battery packs, wait to detect again; if the switch is still in an off state, finally turn off the safety switch of the whole machine and force the system to sleep; if the switch is not turned off, turn on A/D for power supply, show all battery normal light of the LED lamps, and also turn on the normal work light of the machine;

In the embodiment, if the battery directly meets the voltage and the number of series required for starting the function head, the current is directly connected to the P+ line through the B+ line. The B-line will reach the output voltage conversion circuit by directly passing over the supply wake-up circuit and the voltage sampling circuit and then is directly supplied to the PIN port of the main machine for voltage output without conversion;

A Q4 of the MOS transistor will be switched on by starting the supply wake-up circuit, the voltage reaches 12V and 5V voltage conversion unit through the D1 line so as to meet the power demand of other circuits of the whole controller;

The output voltage circuit consists of the PWM voltage control unit, the output voltage sampling circuit, the output voltage conversion circuit, the output voltage regulator circuit, the output voltage filter circuit and the communication control processing unit;

The default output voltage is 18V, when the Q1 circuit 9-18 is switched on, the voltage at the B+ terminal flows to the Q1 circuit through the L1 and then flows to the B− terminal of the mobile battery pack through the RS, when the voltage is output to the P+ and P−, the voltage is divided at both ends of R9, R1, Q2 and R10, Q3, R2 to get a voltage difference; the voltage difference is transmitted to the output voltage regulator circuit for comparison, and the output voltage is regulated by regulating the PWM voltage control unit so as to reach the 18V first. At this moment, the communication control processing unit reads the information of the mobile battery and the whole all-in-one tool, the R11 and the C3 adjust the proportion of the output voltage regulator circuit to reach the output voltage so as to meet service voltage requirements for function heads; the output voltage outputs voltage spikes smoothly and slowly by the output voltage filter circuit so as to make the power supply for the function heads in a steady state; the communication control processing unit obtains the voltage, the number of series, the temperature and other information of the mobile battery pack by reading the COM port of the mobile battery pack, the communication level conversion circuit reads voltage, current and other parameters required for operating the function heads and then the operation state of the output voltage regulator circuit and the PWM voltage control unit are regulated after calculating the parameters; the current state is displayed by the LED indicator drive module; the real voltage of the mobile battery pack is obtained by the voltage sampling circuit to achieve an under-voltage secondary protection mechanism of the mobile battery pack.

The specific embodiments described herein are merely illustrative of the spirit of the disclosure. Those skilled in the art to which the disclosure belongs may make various modifications or supplements or similar alternatives to the described specific embodiments without departing from the spirit of the disclosure or out of the scope defined in the appended claims.

The invention claimed is:

1. A multi-purpose portable gardening tool with multiple heads and combinations, comprising a main machine (1), a function head (2), an extension tube (3), an extension intermediate head (4) and a function intermediate head (5); the function head (2) or the extension intermediate head (4) is in spigot joint with a head end of the main machine (1), a head end of the extension intermediate head (4) is connected to the extension tube (3) having the function intermediate head (5) disposed at a head end thereof, and the function head (2) is in spigot joint with a head end of the function intermediate head;

a power supply cord or a mild steel wire drive shaft (9-1) is disposed in the extension tube (3), a crankshaft sleeve (9-2) is disposed at a head end of the mild steel wire drive shaft (9-1), a connecting shaft core (9-3) is disposed at a tail end of the extension tube (3), and power output shafts of the crankshaft sleeve (9-2) and the main machine (1) or power input gears or screws of the extension intermediate head (4) are engaged with each other;

the main machine (1) comprises a grip handle (6) and a mobile battery pack (7), insertion chutes (8) and electrically connected PIN connectors (9) are disposed on the top of the mobile battery pack (7), battery slots (10) matched with the insertion chutes (8) are disposed at the bottom or a tail end or both bottom and tail end of the grip handle (6), main machine wired PINs (11) are disposed in the battery slots (10), the insertion chutes (8) of the mobile battery pack (7) are in spigot joint with the battery slots (10), the electrically connected PIN connectors (9) and the main machine wired PINs (11) are integrally fastened, and the mobile battery pack (7) is connected to the grip handle (6);

the function intermediate head (5) comprises a function head junction (24), a turning support (25), a circular rotation shaft (26), a control unit (27) and a front insertion sleeve (23), the turning support (25) which rotates around the circular rotation shaft (26) is disposed in the front of the circular rotation shaft (26) and is provided with a function connecting PIN (29) which is integrally formed with and protruded on a head of the turning support (25), and function head connecting chutes (30) are respectively disposed on left and right outer edges of the function connecting PIN (29); the control unit (27) is fixedly disposed behind the circular rotation shaft (26), and a function head start button (31) is disposed on the top or an outer side of the control unit (27), and the front insertion sleeve (23) which is integrally formed with the control unit (27) is disposed on the bottom of the control unit (27);

the function head (2) comprises a connection machine head (32) and a function machine head (33), the function machine head (33) comprises a chain saw function head (34), a grass trimmer function head (35), a bush saw head (36) and a leaf blower head (37), and the function machine head (33) is provided with the connection machine head (32) integrally; an insertion chute (38) is outwardly disposed on the connection machine head (32), connected to the function head connecting chutes (30) of the function head (2) junction and also provided with a drive PIN connector (39), and the drive PIN connector is fastened with the function connecting PIN to form an electric connection;

an extension junction (12) which is provided with an extension chute (13) is further disposed at a head end of the grip handle (6), and the extension chute (13) is provided with an extension electric PIN connector (14) inside and further provided with a fastening device (15); the main machine (1) is in spigot joint with the insertion chute (38) of the connection machine head (32) through the insertion chute (8) of the grip handle (6) so that the fixed connection relation between the main machine (1) and the connection machine head (32) is strengthened on the side face through the fastening device (15);

the extension intermediate head (4) comprises an extension end (16) and a main machine end (17), and the shape of the extension end (16) is matched with that of the extension tube (3); a rear insertion sleeve (18) is disposed at a head end of the extension intermediate head (4) and a driven insertion chute (19) of the insertion chute of the function head (2) is disposed at tail end thereof, and a driven PIN connector (20) matched with the electrically connected PIN connector (9) is disposed on the driven insertion chute (19); the extension tube (3) is inserted into the rear insertion sleeve (18), the driven insertion chute (19) and the insertion chute of the function head (2) are in spigot joint with each other in a sliding manner, and an electric connection is formed between the main machine (1) and the extension intermediate head (4) after the driven PIN connector (20) and the electrically connected PIN connector (9) are fastened with each other;

the extension tube (3) at least comprises tube bodies (21) and a tube adapter (22), a head end of each tube body (21) is inserted into the rear insertion sleeve (18) of the extension intermediate head (4) and a tail end thereof is inserted into the front insertion sleeve (23) so as to connect to the function intermediate head (5), and a connection of spigot joint between any two tube bodies (21) is strengthened by the adapter sleeve (22); and the tail end of the tube body (21) is inserted into the front insertion sleeve (23);

the chain saw function head (34) comprises the connection machine head (32), a motor power unit (1-1) and a chain saw blade (1-2), an upper handle (1-3) and a control handle (1-4) are disposed at the top of the motor power unit (1-1) and a sub-end slot (1-5) is disposed at a tail end thereof; a drive motor (1-6), a drive shaft of which is connected to the chain saw blade (1-2), is disposed in the motor power unit (1-1), and a brake neck (1-7) is disposed at a tail end of the chain saw blade (1-2); the drive motor (1-6) is provided with an emergency brake module (1-8) which is connected to the drive motor (1-6) and the control handle (1-4) respectively and comprises a brake (1-9), a control circuit (1-10), a handle control circuit (1-11) and a circuit controller (1-12) which is electrically connected to the control circuit (1-10); one end of the brake (1-9) is electrically connected to a power supply port (1-13) of an adopter through the control circuit (1-10) and the other end thereof is provided with the handle control circuit (1-11) electrically connected to the control handle (1-4) in an opening-closing manner, the control handle (1-4) comprises a handle body (1-14) having a brake torsion spring (1-15) disposed at a root thereof, a tumbler (1-16) having a split brake reed (1-17) disposed on the bottom thereof is disposed on the bottom of the brake torsion spring (1-15), one end of the split brake reed (1-17) is connected to the drive motor (1-6) and the other end is connected to a safety circuit (1-18); the split brake reed (1-17) is splayed, and a toggle contact switch (1-19) is disposed at an upper end of a tail of the split brake reed (1-17), a control handle groove (1-20) is disposed on a head at a top end of the motor power unit (1-1), the control handle (1-4) is inserted into the control handle groove (1-20) and fixed in the motor power unit (1-1) by the brake torsion spring (1-15), the control handle groove (1-20) comprises a left slotted piece (1-21) and a right slotted piece (1-22), a limit piece (1-23) is disposed on an outer side of the brake torsion spring (1-15) of the control handle (1-4), and a triangle top (1-24) is disposed in the center of the split brake reed (1-17);

the leaf blower head (37) comprises a drive elbow tube (2-1), an air inlet power unit (2-2) and an air duct tube (2-3); the mild steel wire drive shaft is sleeved in the drive elbow tube (2-1), and the air inlet power unit (2-2) comprises a continuously variable transmission hearing (2-4) into which an air rotor (2-5) is inserted, the bottom of the air rotor (2-5) is connected to a turbofan (2-6), a turbofan housing and a turbine disc (2-7) of the air duct tube (2-3), the 9-shaped turbofan housing (2-8) is provided outside the turbofan (2-6) and a turbine air duct (2-9) is formed between the 9-shaped turbofan housing (2-8) and the turbofan (2-6); an air inlet hemisphere (2-10) is disposed on the bottom of the turbine disc 2-7, a reverse-turbine air duct (2-11) is reversely disposed around the air inlet hemisphere and the 9-shaped turbofan housing (2-8), and splitter dampers (2-12) are disposed at a head end of the turbine air duct (2-9);

the bush saw head (36) comprises the connection machine head (32) and a main bush saw (3-1), the connection machine head (32) is disposed at a tail end of the main bush saw (3-1) which is covered by a bush saw housing (3-2) and provided with a saw motor (3-3) inside, the saw motor (3-3) is disposed on a motor base (3-4) having a drive wheel (3-5) disposed on the bottom thereof and a saw blade supporting guide rod (3-6) at a front end thereof; the saw motor (3-3) is provided with a number of saw blades (3-7) spliced together, a tow line (3-8) hinged on the drive wheel (3-5) is disposed at a tail end of the saw blade (3-7), and the bush saw housing (3-2) is provided with a pressure baffle (3-10) at a front end of a rotary handle (3-9), and detachable metal pressure rods, head ends of which are crimped onto multistage compression legs (3-11) disposed at a head end of the saw blade supporting guide rod (3-6), are disposed in front of the pressure baffle (3-10);

the grass trimmer function head (35) comprises the connection machine head (32) and a main grass trimmer (4-2) comprising a semi-arc housing (4-3); a grass trimmer drive unit (4-4), which extends outwardly to be provided with the connection machine head (32), is disposed on the top of the semi-arc housing (4-3); a grass trimmer motor (4-5) is disposed in the grass trimmer drive unit (4-4), and a grass trimmer shaft (4-6) of the grass trimmer motor (4-5) is exposed from a driving hole (4-7) on the top of the semi-arc housing (4-3) by passing over the semi-arc housing (4-3) and is in screwed connection with a multicolor grass trimmer head (4-8), the multicolor grass trimmer head (4-8) comprises an accommodating base (4-8a), a shrink disk (4-9), a coil (4-10) and a trimmer line set (4-11); the accommodating base (4-8a) is in a shape of round bowl; a head cover (4-13), having a mounting hole (4-14) disposed at a position where an axis thereof is located, is disposed on the top of a bowl-shaped tube (4-12) of the accommodating base (4-8a), the mounting hole (4-14) is in screwed connection with the grass trimmer shaft (4-6), and an idler shaft (4-15) is provided below the mounting hole (4-14);

a pair of cover rotation clips (4-16) are disposed on a lateral axis of the howl-shaped tube (4-12) and a line end clip (4-17) is disposed on a vertical axis thereof, the cover rotation clips (4-16) are composed of ]-shaped concave pieces (4-18) and cramps (4-19) in front of the concave pieces, catching grooves are formed between the concave pieces (4-18) and the cramps (4-19), and an eyelet hole (4-21) is disposed in the line end clip (4-17);

the shrink disk comprises a chassis (4-22) and splicing pieces (4-23) disposed on the chassis (4-22) vertically and upwardly, a coil bottom mounting hole (4-24) is disposed at a position where an axis of the shrink disk (4-9) is located, and the splicing pieces (4-23) are clamped into the catching grooves (4-20); the coil (4-10) comprises top fasteners (4-25), a spacer (4-26), a coil column (4-27) and bottom fasteners (4-28), the top fasteners (4-25) are disposed at the top of the coil column (4-27) and the bottom fasteners (4-28) are disposed at a tail end thereof; the top fasteners (4-25) and the spacer (4-26) form an upper bale tray (4-29), the coil column (4-27) and the bottom fasteners (4-28) form a lower hale tray (4-30), and the trimmer line set is sleeved in the upper bale tray (4-29) and the lower bale tray (4-30); the trimmer line set is a winding line or a line coil assembly and at least comprises an upper line coil assembly (4-31) sleeved in the upper bale tray (4-29) and a lower line coil assembly (4-32) sleeved in the lower bale tray (4-30); the coil column (4-27), having a sealing head (4-33) on the bottom thereof, is a hollow tube inside, a pay-off snap ring (4-34) is tightly disposed above the sealing head inside the tube body of the coil column (4-27) and is sleeved with a pay-off spring (4-35) with a top resisting against the shrink disk (4-9); and the fastening device (15) is a top fastening device (5-1), or an internal pressure fastening device (6-1), or a lateral fastening device (7-1).

2. The multi-purpose portable gardening tool with multiple heads and combinations according to claim 1, wherein the top fastening device (5-1) comprises connection fixing grooves (5-2) disposed at the top of the connection machine head (32) and the extension junction (12), a trigger buckle (5-3) is disposed in the connection fixing grooves (5-2) having a trigger fixed shaft (5-4) disposed at a head end or a tail end thereof, the trigger fixed shaft (5-4) is inserted into a tail end of the trigger buckle (5-3), the trigger buckle (5-3) rotates around the trigger fixed shaft (5-4), and a lock shaft (5-5) is disposed in the middle of the trigger buckle (5-3); a lock plate (5-6) is in spigot joint with the lock shaft (5-5), an L-shaped buckle holder (5-7) is disposed in the middle of the connection fixing grooves (5-2), the lock plate (5-6) is fastened into the L-shaped buckle holder (5-7), and a safety switch press button (5-8) is disposed at a head end of the trigger buckle (5-3).

3. The multi-purpose portable gardening tool with multiple heads and combinations according to claim 2, wherein an intermittent trigger switch (8-2) is disposed in a handle groove (8-1) of the grip handle (6) and comprises a transverse shifter (8-3), a safety switch (8-4) and a tangential dynamic trigger (8-5), the transverse shifter (8-3) comprises a walking shaft (8-6) and a walking stopper (8-7), the walking shaft (8-6) at a head end of the walking stopper (8-7) is matched with and suspended in a safety mounting hole (8-9) of the handle shell, a notch (8-10) is disposed in the middle of the walking shaft (8-6), a reset spring (8-11) is disposed above the tangential dynamic trigger (8-5) which is staggered with the safety switch (8-4), and a shifting block (8-12) resisted against an elastic contact piece (8-13) of the safety switch (8-4) is disposed at a head end of the tangential dynamic trigger (8-5); the structural shape of the elastic contact piece (8-13) is matched with that of the tangential dynamic trigger (8-5), a section of the tangential dynamic trigger (8-5) is U-shaped and provided with trigger slots, the walking stopper (8-7) is downwardly provided with left and right stoppers (8-14) matched with the trigger slots, and the safety switch is electrically connected to a voltage compatible controller (8-15) and a trigger switch.

4. The multi-purpose portable gardening tool with multiple heads and combinations according to claim 2, wherein the voltage compatible controller (8-15) is electrically connected to an LED indicator drive module (8-16) assembled by batteries through the main machine wired PINs (11) of the mobile battery pack (7);

the voltage compatible controller (8-15) is also electrically connected to the electrically connected PIN connector (9) of the main machine and to the main machine wired PINs (11) in the battery slots (10), and connected to the main machine (1) to form an electric circuit; the voltage compatible controller (8-15) comprises a communication control processing unit (9-1a), a supply wake-up circuit (9-2a), a voltage sampling circuit (9-13), a 12V voltage conversion unit (9-4), a 5V voltage conversion unit (9-5), a PWM voltage control unit (9-6), an output voltage regulator circuit (9-7), an output voltage sampling circuit (9-8), an output voltage conversion circuit (9-9), an LED display circuit (9-10), an output voltage filter circuit (9-11), a communication level conversion circuit (9-12) and rechargeable battery series (9-13); the main machine wired PIN is provided with a P+ line (9-14), a P− line (9-15) and a COM line (9-16) downwardly, a safety switch (9-17) of the compatible controller is disposed on the P+ line, a lower end of the P+ line is connected to a positive pole of the output voltage filter circuit, and the P− line is connected to a negative pole thereof and also connected to the communication level conversion circuit, and the COM line is also connected to the communication level conversion circuit; the communication level conversion circuit is provided with an output circuit connected to the voltage sampling circuit and also provided with a resistor circuit connected to the P− line in series, the P− line is connected to the output voltage sampling circuit after passing through the communication level conversion circuit; the output voltage sampling circuit is provided with a circuit electrically connected to a B+ line which is provided with the voltage conversion unit at an upper end of a joint on the circuit the voltage conversion unit comprises the 12V voltage conversion unit and the 5V voltage conversion unit which are connected in series; the B+ line is provided with the voltage sampling circuit on a lower end line of the joint of the circuit and then provided with the supply wake-up circuit, the supply wake-up circuit is connected to the B+ line and a B− line, the B+ line and the B− line are connected to positive and negative poles of the mobile battery pack at a tail end, and the mobile battery pack is also provided with a COM line connected to the communication processing and control unit; the communication processing and control unit includes the LED indicator drive module and the PWM voltage control unit, the PWM voltage control unit is connected to the output voltage regulator circuit, the output voltage conversion circuit and the communication level conversion circuit, and the electrically connected PIN connector is also provided with battery anti-reverse chips (9-18) connected in series.

5. The multi-purpose portable gardening tool with multiple heads and combinations according to claim 2, wherein the LED indicator drive module (8-16) is disposed on the PIN of the mobile battery pack or the mobile battery pack (7) and comprises a lamp drive unit (9-19), a control unit (9-20), a single battery sampling unit (9-21) and an LED lamp bank (9-22); a lower end of the LED lamp bank (9-22) is electrically connected to the lamp drive unit (9-19) which is in control connection with the single battery sampling unit (9-21) by a control line disposed on the control unit, the single battery sampling unit (9-21) is provided with a sampling line (9-23) electrically connected to the main machine wired PINs (11), and the mobile battery pack (7) is provided outside the main machine wired PINs (11); output filter elimination capacitors (9-24), which are electrically connected to the lamp drive unit (9-19), the single battery sampling unit (9-21) and output filter elimination capacitors (9-25), are also disposed between the LED lamp bank (9-22) and the lamp drive unit (9-19); the control unit comprises a control unit chip and a communication control triode, a head end of the communication control triode is electrically connected to the control unit chip and a tail end thereof is divided into two electric connection branches connected to the output filter elimination capacitors and a filter capacitor bank respectively, and electric connection branches of the filter capacitor bank are further electrically connected to the main machine wired PINs; an LED lamp switch control switch (9-26) is disposed between the control unit and the lamp drive unit; a memory chip (9-27) is also bridged between the single battery sampling unit and the control unit a battery anti-reverse diode (9-28) is also disposed between the single battery sampling units.

6. The multi-purpose portable gardening tool with multiple heads and combinations according to claim 2, wherein the saw motor (3-3) or the drive motor of the chain saw function head (34) or the main bush saw (3-1) is provided with a start connector (10-1) outside the housing, an inner starter is disposed in the start connector (10-2), comprising a housing (10-3), and a device tube seat (10-6) is disposed in the housing a power transfer end hole (10-7) and a power output end hole (10-8) are respectively formed on both sides of the device tube seat (10-6), a power transfer end assembly (10-4) and a power output end assembly (10-5) are inserted into the device tube seat (10-6).

7. The multi-purpose portable gardening tool with multiple heads and combinations according to claim 1, wherein the internal pressure fastening device (6-1) is disposed in the extension junction (12), and a button hole (6-2) is disposed on an outer wall of a maim machine head housing (6-12) close to the extension chute (13); the internal pressure fastening device (6-1) comprises a reaction fixed plate (6-4), a reset spring (6-5), and a pressure piece (6-6) which comprises a fixed plate (6-8) and an L-shaped tongue piece (6-7), a button (6-9) is protruded on the fixed plate (6-8) which is in screwed connection with the maim machine head housing (6-12) through screws, a hollow cavity (6-10) inside an opposite side of the button (6-9) is fixedly provided with the reset spring (6-5), and the reaction fixed plate (6-4) is resisted against the bottom of the reset spring (6-5); the tongue piece (6-7) straightly extends toward the extension chute (13); tongue piece catching grooves (6-11) matched with the tongue piece (6-7) are disposed on the insertion chute (38) of the function machine head (33) and the insertion chute of the extension intermediate head (4), the function head (33) or the extension intermediate head (4) is in spigot joint with the extension chute (13) to press the tongue piece (6-7) until the tongue piece (6-7) is fastened into the tongue piece catching groove (6-11), and the structures of the mirror-symmetrical internal pressure fastening devices are disposed on both sides of the maim machine head housing (6-12).

8. The multi-purpose portable gardening tool with multiple heads and combinations according to claim 7, wherein an intermittent trigger switch (8-2) is disposed in a handle groove (8-1) of the grip handle (6) and comprises a transverse shifter (8-3), a safety switch (8-4) and a tangential dynamic trigger (8-5), the transverse shifter (8-3) comprises a walking shaft (8-6) and a walking stopper (8-7), the walking shaft (8-6) at a head end of the walking stopper (8-7) is matched with and suspended in a safety mounting hole (8-9) of the handle shell, a notch (8-10) is disposed in the middle of the walking shaft (8-6), a reset spring (8-11) is disposed above the tangential dynamic trigger (8-5) which is staggered with the safety switch (8-4), and a shifting block (8-12) resisted against an elastic contact piece (8-13) of the safety switch (8-4) is disposed at a head end of the tangential dynamic trigger (8-5); the structural shape of the elastic contact piece (8-13) is matched with that of the tangential dynamic trigger (8-5), a section of the tangential dynamic trigger (8-5) is U-shaped and provided with trigger slots, the walking stopper (8-7) is downwardly provided with left and right stoppers (8-14) matched with the trigger slots, and the safety switch is electrically connected to a voltage compatible controller (8-15) and a trigger switch.

9. The multi-purpose portable gardening tool with multiple heads and combinations according to claim 7, wherein the voltage compatible controller (8-15) is electrically connected to an LED indicator drive module (8-16) assembled by batteries through the main machine wired PINs (11) of the mobile battery pack (7);

the voltage compatible controller (8-15) is also electrically connected to the electrically connected PIN connector (9) of the main machine and to the main machine wired PINs (11) in the battery slots (10), and connected to the main machine (1) to form an electric circuit; the voltage compatible controller (8-15) comprises a communication control processing unit (9-1a), a supply wake-up circuit (9-2a), a voltage sampling circuit (9-13), a 12V voltage conversion unit (9-4), a 5V voltage conversion unit (9-5), a PWM voltage control unit (9-6), an output voltage regulator circuit (9-7), an output voltage sampling circuit (9-8), an output voltage conversion circuit (9-9), an LED display circuit (9-10), an output voltage filter circuit (9-11), a communication level conversion circuit (9-12) and rechargeable battery series (9-13); the main machine wired PIN is provided with a P+ line (9-14), a P− line (9-15) and a COM line (9-16) downwardly, a safety switch (9-17) of the compatible controller is disposed on the P+ line, a lower end of the P+ line is connected to a positive pole of the output voltage filter circuit, and the P− line is connected to a negative pole thereof and also connected to the communication level conversion circuit, and the COM line is also connected to the communication level conversion circuit; the communication level conversion circuit is provided with an output circuit connected to the voltage sampling circuit and also provided with a resistor circuit connected to the P− line in series, the P− line is connected to the output voltage sampling circuit after passing through the communication level conversion circuit; the output voltage sampling circuit is provided with a circuit electrically connected to a B+ line which is provided with the voltage conversion unit at an upper end of a joint on the circuit; the voltage conversion unit comprises the 12V voltage conversion unit and the 5V voltage conversion unit which are connected in series; the B+ line is provided with the voltage sampling circuit on a lower end line of the joint of the circuit and then provided with the supply wake-up circuit, the supply wake-up circuit is connected to the B+ line and a B− line, the B+ line and the B− line are connected to positive and negative poles of the mobile battery pack at a tail end, and the mobile battery pack is also provided with a COM line connected to the communication processing and control unit; the communication processing and control unit includes the LED indicator drive module and the PWM voltage control unit, the PWM voltage control unit is connected to the output voltage regulator circuit, the output voltage conversion circuit and the communication level conversion circuit, and the electrically connected PIN connector is also provided with battery anti-reverse chips (9-18) connected in series.

10. The multi-purpose portable gardening tool with multiple heads and combinations according to claim 7, wherein the LED indicator drive module (8-16) is disposed on the PIN of the mobile battery pack or the mobile battery pack (7) and comprises a lamp drive unit (9-19), a control unit (9-20), a single battery sampling unit (9-21) and an LED lamp bank (9-22); a lower end of the LED lamp bank (9-22) is electrically connected to the lamp drive unit (9-19) which is in control connection with the single battery sampling unit (9-21) by a control line disposed on the control unit, the single battery sampling unit (9-21) is provided with a sampling line (9-23) electrically connected to the main machine wired PINs (11), and the mobile battery pack (7) is provided outside the main machine wired PINs (11); output filter elimination capacitors (9-24), which are electrically connected to the lamp drive unit (9-19), the single battery sampling unit (9-21) and output filter elimination capacitors (9-25), are also disposed between the LED lamp bank (9-22) and the lamp drive unit (9-19); the control unit comprises a control unit chip and a communication control triode, a head end of the communication control triode is electrically connected to the control unit chip and a tail end thereof is divided into two electric connection branches connected to the output filter elimination capacitors and a filter capacitor bank respectively, and electric connection branches of the filter capacitor bank are further electrically connected to the main machine wired PINs; an LED lamp switch control switch (9-26) is disposed between the control unit and the lamp drive unit; a memory chip (9-27) is also bridged between the single battery sampling unit and the control unit; a battery anti-reverse diode (9-28) is also disposed between the single battery sampling units.

11. The multi-purpose portable gardening tool with multiple heads and combinations according to claim 7, wherein the saw motor (3-3) or the drive motor of the chain saw function head (34) or the main bush saw (3-1) is provided with a start connector (10-1) outside the housing, an inner starter is disposed in the start connector (10-2), comprising a housing (10-3), and a device tube seat (10-6) is disposed in the housing; a power transfer end hole (10-7) and a power output end hole (10-8) are respectively formed on both sides of the device tube seat (10-6), a power transfer end assembly (10-4) and a power output end assembly (10-5) are inserted into the device tube seat (10-6).

12. The multi-purpose portable gardening tool with multiple heads and combinations according to claim 1, wherein the lateral fastening device (7-1), comprising a rotary shaft (7-3), a rotary shaft clip (7-4) and a lateral cramp (7-5), is disposed in a lateral fastening groove (7-2) on a side face of the connection machine head (32), or on a side face of the maim machine head housing (6-12); the rotary shaft clip (7-4) is disposed on a housing of the lateral fastening groove (7-2); after being sleeved on the rotary shaft (7-3), the lateral cramp (7-5) is fixed on the rotary shaft clip (7-4) through the rotary shaft (7-3), the rotary shaft (7-3) is also sleeved on the rotary shaft clip (7-4), and the rotary shaft (7-3) and the lateral cramp (7-5) are both joined by the rotary shaft clip (7-4); an L-shaped buckle tongue (7-6), above which a presser (7-7) is disposed, is disposed on the bottom of an inner side of the lateral cramp (7-5); a safety switch, a trigger switch of which is disposed in the lateral fastening groove (7-2) so as to match with a pressing position of the presser (7-7), is disposed in the main machine head; a buckle notch (7-8) is disposed on each of left and right side faces of the lateral cramp (7-5), a side button (7-9) matched with the buckle notch (7-8) is disposed in the lateral fastening groove (7-2), and the L-shaped buckle tongue (7-6) is provided with a lateral fixed neck (7-10) matched with the L-shaped buckle tongue (7-6) in the lateral fastening groove (7-2).

13. The multi-purpose portable gardening tool with multiple heads and combinations according to claim 12, wherein an intermittent trigger switch (8-2) is disposed in a handle groove (8-1) of the grip handle (6) and comprises a transverse shifter (8-3), a safety switch (8-4) and a tangential dynamic trigger (8-5), the transverse shifter (8-3) comprises a walking shaft (8-6) and a walking stopper (8-7), the walking shaft (8-6) at a head end of the walking stopper (8-7) is matched with and suspended in a safety mounting hole (8-9) of the handle shell, a notch (8-10) is disposed in the middle of the walking shaft (8-6), a reset spring (8-11) is disposed above the tangential dynamic trigger (8-5) which is staggered with the safety switch (8-4), and a shifting block (8-12) resisted against an elastic contact piece (8-13) of the safety switch (8-4) is disposed at a head end of the tangential dynamic trigger (8-5), the structural shape of the elastic contact piece (8-13) is matched with that of the tangential dynamic trigger (8-5), a section of the tangential dynamic trigger (8-5) is U-shaped and provided with trigger slots, the walking stopper (8-7) is downwardly provided with left and right stoppers (8-14) matched with the trigger slots, and the safety switch is electrically connected to a voltage compatible controller (8-15) and a trigger switch.

14. The multi-purpose portable gardening tool with multiple heads and combinations according to claim 12, wherein the voltage compatible controller (8-15) is electrically connected to an LED indicator drive module (8-16) assembled by batteries through the main machine wired PINs (11) of the mobile battery pack (7):

the voltage compatible controller (8-15) is also electrically connected to the electrically connected PIN connector (9) of the main machine and to the main machine wired PINs (11) in the battery slots (10), and connected to the main machine (I) to form an electric circuit; the voltage compatible controller (8-15) comprises a communication control processing unit (9-1*a*), a supply wake-up circuit (9-2*a*), a voltage sampling circuit (9-13), a 12V voltage conversion unit (9-4), a 5V voltage conversion unit (9-5), a PWM voltage control unit (9-6), an output voltage regulator circuit (9-7), an output voltage sampling circuit (9-8), an output voltage conversion circuit (9-9), an LED display circuit (9-10), an output voltage filter circuit (9-11), a communication level conversion circuit (9-12) and rechargeable battery series (9-13); the main machine wired PIN is provided with a P+ line (9-14), a P− line (9-15) and a COM line (9-16) downwardly, a safety switch (9-17) of the compatible controller is disposed on the P+ line, a lower end of the P+ line is connected to a positive pole of the output voltage filter circuit, and the P− line is connected to a negative pole thereof and also connected to the communication level conversion circuit, and the COM line is also connected to the communication level conversion circuit; the communication level conversion circuit is provided with an output circuit connected to the voltage sampling circuit and also provided with a resistor circuit connected to the P− line in series, the P− line is connected to the output voltage sampling circuit after passing through the communication level conversion circuit; the output voltage sampling circuit is provided with a circuit electrically connected to a B+ line which is provided with the voltage conversion unit at an upper end of a joint on the circuit; the voltage conversion unit comprises the 12V voltage conversion unit and the 5V voltage conversion unit which are connected in series; the B+ line is provided with the voltage sampling circuit on a lower end line of the joint of the circuit and then provided with the supply wake-up circuit, the supply wake-up circuit is connected to the B+ line and a B− line, the B+ line and the B− line are connected to positive and negative poles of the mobile battery pack at a tail end, and the mobile battery pack is also provided with a COM line connected to the communication processing and control unit; the communication processing and control unit includes the LED indicator drive module and the PWM voltage control unit, the PWM voltage control unit is connected to the output voltage regulator circuit, the output voltage conversion circuit and the communication level conversion circuit, and the electrically connected PIN connector is also provided with battery anti-reverse chips (9-18) connected in series.

15. The multi-purpose portable gardening tool with multiple heads and combinations according to claim 1, wherein an intermittent trigger switch (8-2) is disposed in a handle groove (8-1) of the grip handle (6) and comprises a transverse shifter (8-3), a safety switch (8-4) and a tangential dynamic trigger (8-5), the transverse shifter (8-3) comprises a walking shaft (8-6) and a walking stopper (8-7), the walking shaft (8-6) at a head end of the walking stopper (8-7) is matched with and suspended in a safety mounting hole (8-9) of the handle shell, a notch (8-10) is disposed in the middle of the walking shaft (8-6), a reset spring (8-11) is disposed above the tangential dynamic trigger (8-5) which is staggered with the safety switch (8-4), and a shifting block (8-12) resisted against an elastic contact piece (8-13) of the safety switch (8-4) is disposed at a head end of the tangential dynamic trigger (8-5); the structural shape of the elastic contact piece (8-13) is matched with that of the tangential dynamic trigger (8-5), a section of the tangential dynamic trigger (8-5) is U-shaped and provided with trigger slots, the walking stopper (8-7) is downwardly provided with left and right stoppers (8-14) matched with the trigger slots, and the safety switch is electrically connected to a voltage compatible controller (8-15) and a trigger switch.

16. The multi-purpose portable gardening tool with multiple heads and combinations according to claim 1, wherein the voltage compatible controller (8-15) is electrically connected to an LED indicator drive module (8-16) assembled by batteries through the main machine wired PINs (11) of the mobile battery pack (7);

the voltage compatible controller (8-15) is also electrically connected to the electrically connected PIN connector (9) of the main machine and to the main machine wired PINs (11) in the battery slots (10), and connected to the main machine (1) to form an electric circuit; the voltage compatible controller (8-15) comprises a communication control processing unit (9-1a), a supply wake-up circuit (9-2a), a voltage sampling circuit (9-13), a 12V voltage conversion unit (9-4), a 5V voltage conversion unit (9-5), a PWM voltage control unit (9-6), an output voltage regulator circuit (9-7), an output voltage sampling circuit (9-8), an output voltage conversion circuit (9-9), an LED display circuit (9-10), an output voltage filter circuit (9-11), a communication level conversion circuit (9-12) and rechargeable battery series (9-13); the main machine wired PIN is provided with a P+ line (9-14), a P− line (9-15) and a COM line (9-16) downwardly, a safety switch (9-17) of the compatible controller is disposed on the P+ line, a lower end of the P+ line is connected to a positive pole of the output voltage filter circuit, and the P− line is connected to a negative pole thereof and also connected to the communication level conversion circuit, and the COM line is also connected to the communication level conversion circuit; the communication level conversion circuit is provided with an output circuit connected to the voltage sampling circuit and also provided with a resistor circuit connected to the P− line in series, the P− line is connected to the output voltage sampling circuit after passing through the communication level conversion circuit; the output voltage sampling circuit is provided with a circuit electrically connected to a B+ line which is provided with the voltage conversion unit at an upper end of a joint on the circuit; the voltage conversion unit comprises the 12V voltage conversion unit and the 5V voltage conversion unit which are connected in series; the B+ line is provided with the voltage sampling circuit on a lower end line of the joint of the circuit and then provided with the supply wake-up circuit, the supply wake-up circuit is connected to the B+ line and a B− line, the B+ line and the B− line are connected to positive and negative poles of the mobile battery pack at a tail end, and the mobile battery pack is also provided with a COM line connected to the communication processing and control unit; the communication processing and control unit includes the LED indicator drive module and the PWM voltage control unit, the PWM voltage control unit is connected to the output voltage regulator circuit, the output voltage conversion circuit and the communication level conversion circuit, and the electrically connected PIN connector is also provided with battery anti-reverse chips (9-18) connected in series.

17. The multi-purpose portable gardening tool with multiple heads and combinations according to claim 1, wherein the LED indicator drive module (8-16) is disposed on the PIN of the mobile battery pack or the mobile battery pack (7) and comprises a lamp drive unit (9-19), a control unit (9-20), a single battery sampling unit (9-21) and an LED lamp bank (9-22); a lower end of the LED lamp bank (9-22) is electrically connected to the lamp drive unit (9-19) which is in control connection with the single battery sampling unit (9-21) by a control line disposed on the control unit, the single battery sampling unit (9-21) is provided with a sampling line (9-23) electrically connected to the main machine wired PINs (11), and the mobile battery pack (7) is provided outside the main machine wired PINs (11); output filter elimination capacitors (9-24), which are electrically connected to the lamp drive unit (9-19), the single battery sampling unit (9-21) and output filter elimination capacitors (9-25), are also disposed between the LED lamp bank (9-22) and the lamp drive unit (9-19); the control unit comprises a control unit chip and a communication control triode, a head end of the communication control triode is electrically connected to the control unit chip and a tail end thereof is divided into two electric connection branches connected to the output filter elimination capacitors and a filter capacitor hank respectively, and electric connection branches of the filter capacitor bank are further electrically connected to the main machine wired PINs; an LED lamp switch control switch (9-26) is disposed between the control unit and the lamp drive unit; a memory chip (9-27) is also bridged between the single battery sampling unit and the control unit; a battery anti-reverse diode (9-28) is also disposed between the single battery sampling units.

18. The multi-purpose portable gardening tool with multiple heads and combinations according to claim 1, wherein the saw motor (3-3) or the drive motor of the chain saw function head (34) or the main bush saw (3-1) is provided with a start connector (10-1) outside the housing, an inner starter is disposed in the start connector (10-2), comprising a housing (10-3), and a device tube seat (10-6) is disposed in the housing; a power transfer end hole (10-7) and a power output end hole (10-8) are respectively formed on both sides of the device tube seat (10-6), a power transfer end assembly (10-4) and a power output end assembly (10-5) are inserted into the device tube seat (10-6).

19. The multi-purpose portable gardening tool with multiple heads and combinations according to claim 18, wherein the power transfer end assembly (10-4) comprises a rolling hearing (10-9) and a power transfer shaft (10-10) on which the rolling bearing (10-9) is sleeved, the power transfer shaft (10-10) comprises a power access head (10-11), a sealing center shaft (10-12) of the transfer shaft and a universal driving shaft tube (10-13) of the transfer shaft, the sealing center shaft (10-12) of the transfer shaft is disposed at a position where the power transfer end hole (10-7) is located, and a head end of the sealing center shaft (10-12) of the transfer shaft extends out of the power access head (10-11) from the device tube seat (10-6), the power access head (10-11) is exposed outside the housing, the universal driving shaft tube (10-13) of the transfer shaft is disposed in the device tube seat (10-6) in the power transfer end hole (10-7), the rolling bearing (10-9) is sleeved on the sealing center shaft (10-12) of the transfer shaft, and the one-way rolling bearing is a one-way needle bearing; and the power output end assembly (10-5) comprises a one-way rolling bearing (10-14) and a power output shaft (10-15); the power output shaft (10-15) comprises a power output head (10-16), a sealing center shaft (10-17) of the output shaft, a universal driving shaft (10-18) of the output shaft and an output end bearing (10-19); the sealing center shaft (10-17) of the output shaft is disposed at a position where the power output end hole (10-8) is located, and a head end of the sealing center shaft (10-17) of the output shaft extends out of the power output head (10-16), the power output head (10-16) is exposed outside the housing from the power output end hole (10-8), the output end bearing (10-19) is sleeved on the sealing center shaft (10-17) of the output shaft, and the one-way rolling bearing (10-14) is sleeved on the universal driving shaft (10-18) of the output shaft.

20. The multi-purpose portable gardening tool with multiple heads and combinations according to claim 1, wherein the top fasteners 4-25 and the bottom fasteners 4-28 are both annular bodies which are provided with threads of the coil inside, the coil column 4-27 is provided with threads 4-39 which are matched with the thickness of the trimmer line coil at upper and lower positions of the spacer 4-2, and the top fasteners 4-25 and the bottom fasteners 4-28 are in screwed connection with the coil column.

* * * * *